US010957240B1

(12) United States Patent
Sears

(10) Patent No.: US 10,957,240 B1
(45) Date of Patent: Mar. 23, 2021

(54) APPARATUS, SYSTEMS, AND METHODS TO COMPENSATE FOR SUB-STANDARD SUB PIXELS IN AN ARRAY

(71) Applicant: Facebook Technologies, LLC, Menlo Park, CA (US)

(72) Inventor: Jasmine Soria Sears, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 106 days.

(21) Appl. No.: 16/357,853

(22) Filed: Mar. 19, 2019

(51) Int. Cl.
*G09G 3/20* (2006.01)
*G02B 27/01* (2006.01)

(52) U.S. Cl.
CPC ....... *G09G 3/2074* (2013.01); *G02B 27/0172* (2013.01); *G02B 2027/0118* (2013.01); *G09G 2300/0452* (2013.01); *G09G 2320/064* (2013.01)

(58) Field of Classification Search
CPC .. G02F 1/292; G02F 2203/07; G02F 2203/24; G02F 1/29; G09G 3/007; G09G 3/2003; G09G 2320/0666; G09G 2320/064; G06T 19/006; H05B 37/0209; G02B 26/005
See application file for complete search history.

(56) References Cited

U.S. PATENT DOCUMENTS

| 9,601,058 | B2* | 3/2017 | Lee | G09G 3/3233 |
| 10,757,398 | B1* | 8/2020 | Magoz | H04N 13/167 |
| 2006/0092151 | A1* | 5/2006 | Allen | G09G 3/007 345/204 |
| 2011/0193880 | A1* | 8/2011 | Imai | G02B 30/25 345/634 |
| 2011/0310232 | A1* | 12/2011 | Wilson | G09G 3/342 348/51 |

(Continued)

OTHER PUBLICATIONS

Sears, Jasmine Soria, "Systems and Methods for Transferring an Image to an Array of Emissive Subpixels", U.S. Appl. No. 16/292,366 dated Mar. 5, 2019, 105 pages.

(Continued)

*Primary Examiner* — William Lu
(74) *Attorney, Agent, or Firm* — FisherBroyles, LLP

(57) ABSTRACT

A system to compensate for sub-standard subpixels in a display device may include an optical system that laterally shifts light emitted by subpixels of an emissive array towards a viewing region using a light deviator that is movable between a plurality of predetermined positions corresponding to one or more lateral-light-shifting degrees of freedom. The system may also include a controller that converts input data into a sequence of instructions for illuminating at least a portion of the subpixels during a plurality of subframes, the sequence of instructions causing each subpixel of at least the portion of the subpixels to be illuminated for a predetermined illumination time while the light deviator is positioned at one or more predetermined light deviator positions such that sub-standard subpixels are each compensated for with light laterally shifted from at least one standard subpixel. Various other apparatus, systems, and methods are also disclosed.

20 Claims, 16 Drawing Sheets

(56) References Cited

U.S. PATENT DOCUMENTS

| | | | | |
|---|---|---|---|---|
| 2012/0280895 | A1* | 11/2012 | Yeh | G02F 1/1323 |
| | | | | 345/87 |
| 2014/0254007 | A1* | 9/2014 | Ma | G02B 30/27 |
| | | | | 359/464 |
| 2014/0327694 | A1* | 11/2014 | Cao | G06T 11/001 |
| | | | | 345/597 |
| 2015/0310798 | A1* | 10/2015 | Heide | G09G 3/36 |
| | | | | 345/55 |
| 2017/0018214 | A1* | 1/2017 | Black | G02B 26/0883 |
| 2018/0166512 | A1* | 6/2018 | Hack | H01L 27/3213 |
| 2019/0243209 | A1* | 8/2019 | Perreault | G02F 1/292 |
| 2019/0318677 | A1* | 10/2019 | Lu | G06F 3/012 |

OTHER PUBLICATIONS

Sears et al., "Systems and Methods Utilizing Rotatable Optics for Projecting Light to a Viewer", U.S. Appl. No. 16/190,758 dated Nov. 14, 2018, 94 pages.

Magoz et al., "Systems & Methods for Generating Temporally Multiplexed Images", U.S. Appl. No. 16/190,776 dated Nov. 14, 2018, 88 pages.

\* cited by examiner

US 10,957,240 B1

APPARATUS, SYSTEMS, AND METHODS TO COMPENSATE FOR SUB-STANDARD SUB PIXELS IN AN ARRAY

BACKGROUND

Emissive arrays produce images made up of many pixels. Such arrays commonly control the color and brightness of each pixel to present an image. A pixel is in turn often composed of multiple subpixels that emit light of differing spectral distributions. Due to its small size, a human eye typically does not perceive a subpixel individually. Instead the eye blends the light emitted from the subpixels producing the impression of a single source of light, the pixel. The color and brightness of a pixel may be controlled by varying the brightness of the underlying subpixels. For example, the underlying subpixels may produce a white pixel by illuminating with equal intensity. The underlying subpixels may produce different pixel colors by changing their relative brightness. The size of the single uniform pixel, which determines the resolution of an array, is typically equal to the sum of the sizes of its constituent subpixels and or the smallest feature that an array may visually resolve.

Subpixel array manufacturers commonly configure subpixels to emit light with the colors of red, blue, or green. These three colors may be combined to span a range of perceivable colors while minimizing the size of a pixel. However, such pixels are often unable to reproduce colors with a wavelength greater than that of the red subpixel or a wavelength less than that of the blue subpixel. An array may produce colors outside of these color ranges using additional subpixels, at the cost of increasing the individual pixel size and loss of resolution, unless the subpixel sizes were to shrink beyond what is currently available.

SUMMARY

As will be described in greater detail below, the instant disclosure generally relates to apparatus, systems, and methods to compensating for sub-standard subpixels in an emissive array of subpixels by generating a plurality of subframes in which the light emitting deficiencies of one or more sub-standard subpixels have been replaced by laterally shifting light from subpixels with standard performance characteristics.

In one example, a system to compensate for sub-standard subpixels in a display device may include (i) an optical system that laterally shifts light emitted by subpixels of an emissive array towards a viewing region using a light deviator that is movable between a plurality of predetermined positions corresponding to one or more lateral-light-shifting degrees of freedom, and (ii) a controller. In some examples, the controller may (i) receive input data and converts the input data into a sequence of instructions for illuminating at least a portion of the subpixels during a plurality of subframes, the sequence of instructions causing each subpixel of at least the portion of the subpixels to be illuminated for a predetermined illumination time while the light deviator is positioned at one or more predetermined light deviator positions such that sub-standard subpixels are each compensated for with light laterally shifted from at least one standard subpixel, and (ii) temporally multiplex the plurality of subframes so as to display an image that is viewable at the viewing region.

In some examples, a first set of subframes of the plurality of subframes may include the converted input data. One or more standard subpixels may be illuminated during a second set of subframes of the plurality of subframes to compensate for sub-standard subpixels that are present in the first set of subframes.

According to various embodiments, the plurality of subframes may include pairs of subframes, with each pair including a first subframe and a second subframe. In this example, the first subframe of a pair may compensate for at least a portion of the sub-standard subpixels present in the second subframe and the second subframe compensates for at least a portion of the sub-standard subpixels present in the first subframe. The first subframe may include a portion of the converted input data distributed in even-numbered lines of the first subframe and the second subframe may include another portion of the converted input data distributed in odd-numbered lines of the second subframe. Additionally, sub-standard subpixel compensation for the first subframe may occur in the even-numbered lines of the second subframe and sub-standard subpixel compensation for the second subframe may occur in the odd-numbered lines of the first subframe.

In at least one embodiment, the plurality of subframes may be generated by the following representation: $SF_j = \Sigma_i^{N_j} f(q_{ij})$, where $SF_j$ is a j-th subframe, including a set of $N_j$ subpixels, each i-th subpixel of the $N_j$ subpixels to be illuminated for $SF_j$, and where $f$ is a function including the plurality of functions of the controller and $q_{ij}$ is a vector that includes a plurality of parameters to form a subframe. In some examples, the plurality of parameters for the j-th subframe may include: $t_{ij}$=time when the i-th subpixel is illuminated; $D_{ij}$=duration of the i-th subpixel illumination; $(x_{ij}, y_{ij})$=location of the i-th subpixel within the emissive array; $I_{ij}$=intensity of the i-th subpixel illumination; $p_{ij}$=position of the LLSO for the i-th subpixel; and a set of incremental deviations of the plurality of parameters, the incremental deviations including: $\Delta t_{ij}$=time deviation during which the i-th subpixel is illuminated; $\Delta x_{ij}, \Delta y_{ij}$=position deviations from the i-th subpixel; and $\Delta p_{ij}$=LLSO or light deviator position deviations for the i-th subpixel. In at least one example, $t_{ij}$ may include a function of mod $(p^k_{ij}, c^k)$, wherein $p^k_{ij}$ is a cyclical component of $p_{ij}$ with a periodicity of $c^k$. A rate of change of the cyclical component of $p_{ij}$ may be adjustable by the controller. In some examples, at least one subframe of the plurality of subframes may be temporally multiplexed to the array of subpixels faster than the periodicity of the cyclical component of $p_{ij}$. In various examples, the light deviator may include a rotatable prism. In some examples, each of the plurality of predetermined positions of the light deviator may correspond to a separate one of the plurality of subframes. In at least one example, the light emitted by each subpixel of at least the portion of the subpixels may be laterally shifted towards one or more virtual subpixel locations corresponding to the one or more predetermined light deviator positions.

In another embodiment, a computer-implemented method to compensate for sub-standard subpixels in a display device may include (i) converting input data by a controller into a sequence of instructions for illuminating at least a portion of subpixels of an emissive array during a plurality of subframes; (ii) laterally shifting light emitted by the subpixels towards a viewing region using a light deviator that is movable between a plurality of predetermined positions corresponding to one or more lateral-light-shifting degrees of freedom; (iii) causing, in accordance with the sequence of instructions, each subpixel of at least the portion of the subpixels to be illuminated while the light deviator is positioned at one or more predetermined light deviator positions such that sub-standard subpixels are each compensated for with light laterally shifted from at least one standard subpixel; and (iv) temporally multiplexing the plurality of subframes so as to display an image that is viewable at the viewing region.

According to at least one embodiment, a first set of subframes of the plurality of subframes may include the converted input data. In this example, causing each subpixel of at least the portion of the subpixels to be illuminated may further include causing, in accordance with the sequence of instructions, one or more standard subpixels to be illuminated during a second set of subframes of the plurality of subframes to compensate for sub-standard subpixels that are present in the first set of subframes. In some embodiments, the plurality of subframes may include pairs of subframes, with each pair including a first subframe and a second subframe. In this example, causing each subpixel of at least the portion of the subpixels to be illuminated may further include (i) causing, in accordance with the sequence of instructions, a first set of standard subpixels to be illuminated during the first subframe of a pair to compensate for at least a portion of the sub-standard subpixels present in the second subframe, and (ii) causing, in accordance with the sequence of instructions, a second set of standard subpixels to be illuminated during the second subframe to compensate for at least a portion of the sub-standard subpixels present in the first subframe.

In some examples, the afore-described method may be encoded as computer-readable instructions on a non-transitory computer-readable medium. For example, a computer-readable medium may include one or more computer-readable instructions that, when executed by at least one processor of a computing device, may cause the computing device to (i) receive input data by a controller; (ii) convert the input data by the controller into a sequence of instructions, the sequence of instructions controlling functions of an optical system and of an array system including a plurality of emissive subpixels, the optical system including a light deviator that is movable between a plurality of positions corresponding to one or more lateral-light-shifting degrees of freedom, and the plurality of subpixels including a set of standard subpixels and a set of sub-standard subpixels, wherein a subset of the sequence of instructions includes instructions to compensate for at least a portion of the set of sub-standard subpixels with light laterally shifted by the light deviator from one or more standard subpixels of the set of standard subpixels; (iii) generate a plurality of subframes from the sequence of instructions; and (iv) temporally multiplex the plurality of subframes using the optical system, the plurality of subframes designed to display an image to a viewer at the viewing region.

An additional system to compensate for sub-standard subpixels in a display device may include a display system that directs light emitted by subpixels of an emissive array towards a viewing region such that the light emitted by each of the subpixels is directed towards a different virtual subpixel location in the viewing region during each of a plurality of predetermined time periods, and a controller that (i) converts input data into a sequence of instructions for illuminating at least a portion of the subpixels during a plurality of subframes, the sequence of instructions causing each subpixel of at least the portion of the subpixels to be illuminated during one or more of the plurality of predetermined time periods such that sub-standard subpixels are each compensated for with light from at least one standard subpixel, and (ii) temporally multiplexes the plurality of subframes so as to display an image that is viewable at the viewing region.

In some embodiments, the display system may include an optical system that (i) receives the light emitted by the subpixels and laterally shifts the received light by a light deviator that is movable between a plurality of predetermined positions corresponding to one or more lateral-light-shifting degrees of freedom, and (ii) directs the laterally shifted light towards the viewing region. In at least one example, the display system may include at least one actuator that translates a position of the emissive array such that the emissive array is in a different predetermined position during each of the plurality of predetermined time periods.

Features from any of the embodiments of the present disclosure may be used in combination with one another in accordance with the general principles described herein. These and other embodiments, features, and advantages may be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
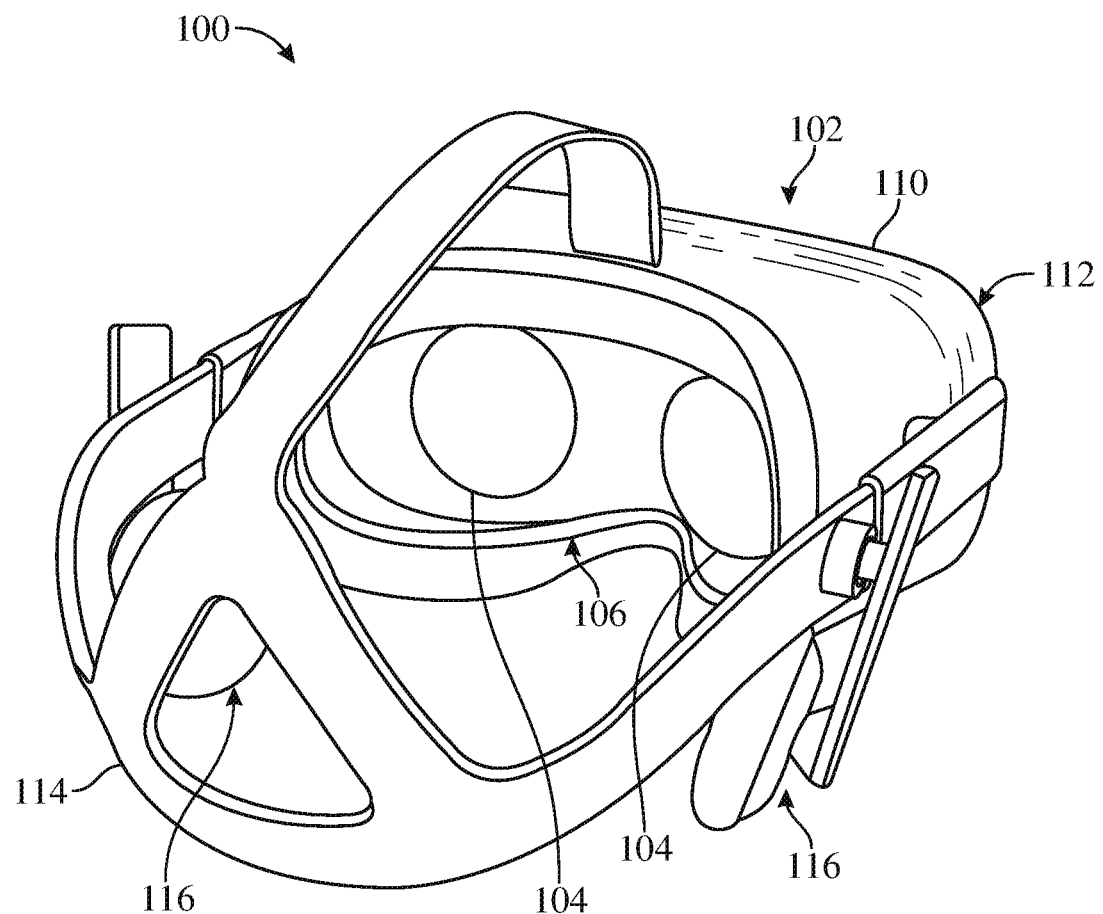
FIG. 1 is a perspective schematic of an example head-mounted display (HMD), in accordance with one or more embodiments disclosed herein.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and may be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to apparatus, systems, and methods for generating an image by temporal multiplexing a set of subframes, in which each subframe contains a portion of the image to be viewed. As will be explained in greater detail below, embodiments of the instant disclosure may include one or more arrays of subpixels utilized in a combination with a computing device. The subpixel arrays may be used in, for example, a head mounted display (HMD), such as a virtual and/or augmented reality display, and/or any other suitable display device having an array of subpixels in which individual pixels and/or subpixels can be separately operable to emit light. The array of subpixels may include a subpixel layout that may include at least a plurality of subpixel types of three or more different colors arranged in selected linear paths, circular or substantially circular paths, and/or any other suitable paths (e.g., rectangular paths, square paths, hexagonal paths, etc.). In some embodiments, a subpixel array may include a light-emitting layer and a color selector layer (e.g., a color filter layer, a color converting emissive layer, etc.) that may be moved parallel relative to the light-emitting layer by an actuator.

The described arrays and subpixel arrangements may allow for spatial and/or temporal pixel or subpixel averaging. Each pixel may include subpixels that are operable to emit a white light when illuminated concurrently. Each color of a subpixel may lie on a circular path such that a circular translation may allow each color subpixel to appear in the same location. In some examples, a pixel or subpixel at one physical location on the array may be perceived by a viewer to originate from a different array location, while the array remains stationary.

Embodiments of the present disclosure may include or be implemented in conjunction with an artificial reality system. Artificial reality is a form of perceived reality that has been adjusted in some manner before presentation to a user, which may include, e.g., a virtual reality, an augmented reality, a mixed reality, a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in artificial reality and/or are otherwise used (e.g., perform activities) in artificial reality.

An artificial reality system that provides the artificial reality content may be implemented on various platforms, including a head-mounted array (HMD) connected to a host computer system, a standalone HMD such as the one depicted in FIG. 1, a mobile device, or computing system, or any other hardware platform capable of providing artificial reality content to one or more viewers. Emerging applications require higher resolution of subpixel arrays, faster frame-rates, smaller total size, lighter weight, lower-power, higher color gamut, etc.

Embodiments of the present disclosure relate to apparatus and methods for manipulating the direction of light emitted from subpixels in a subpixel array to apparent locations of other subpixels in that array by laterally shifting the emitted light. Such lateral shifting can aid in increasing the brightness of the apparent subpixel. Additionally, or alternatively, the color of an apparent subpixel may be altered by combining laterally shifted light from other subpixels operable to emit light of varying colors and/or intensities.

The apparatus and methods presented herein may facilitate shifting a relative position of a subpixel array to an optical assembly coupled to the array of subpixels during scanning of the subpixel array to obtain an image presented to an eye box having a resolution greater than an original resolution of the array.

FIG. 1 is a perspective view of an HMD 100, in accordance with one or more embodiments disclosed herein. The HMD 100 may be part of an artificial reality system. In embodiments that describe an augmented-reality system and/or a mixed-reality system, portions of an HMD device 102 of the HMD 100 may be at least partially transparent in the visible band (380 nm to 750 nm), and portions of the HMD 100 that may be between the HMD device 102 of the HMD 100 and an eye of the user may be at least partially transparent (e.g., a partially transparent array).

In some embodiments, HMD 100 may include an HMD device 102, a strap subsystem 114, and audio subsystems 116. HMD device 102 may include any type or form of array device or system that is worn on or about a user's head and projects visual content to the user. HMD device 102 may project content in any suitable manner, including via a screen (e.g., a liquid crystal array (LCD) or a light-emitting diode (LED) screen), a projector, a cathode ray tube, an optical mixer, etc. HMD device 102 may project content in one or more of various media formats. For example, HMD device 102 may project videos, photos, and/or computer-generated imagery (CGI). HMD device 102 may include a housing 110 surrounding components of HMD device 102, including lenses 104 and various structural, mechanical, and electronic components, including array components as described herein. Housing 110 may define an opening surrounding a viewing region 106 configured to surround a portion of a user's face and field-of-view. Additionally, housing 110 may include a front-facing portion 112 disposed away from viewing region 106 and side surfaces extending from front-facing portion 112 and surrounding the internal components of HMD 102.

Figure 2:
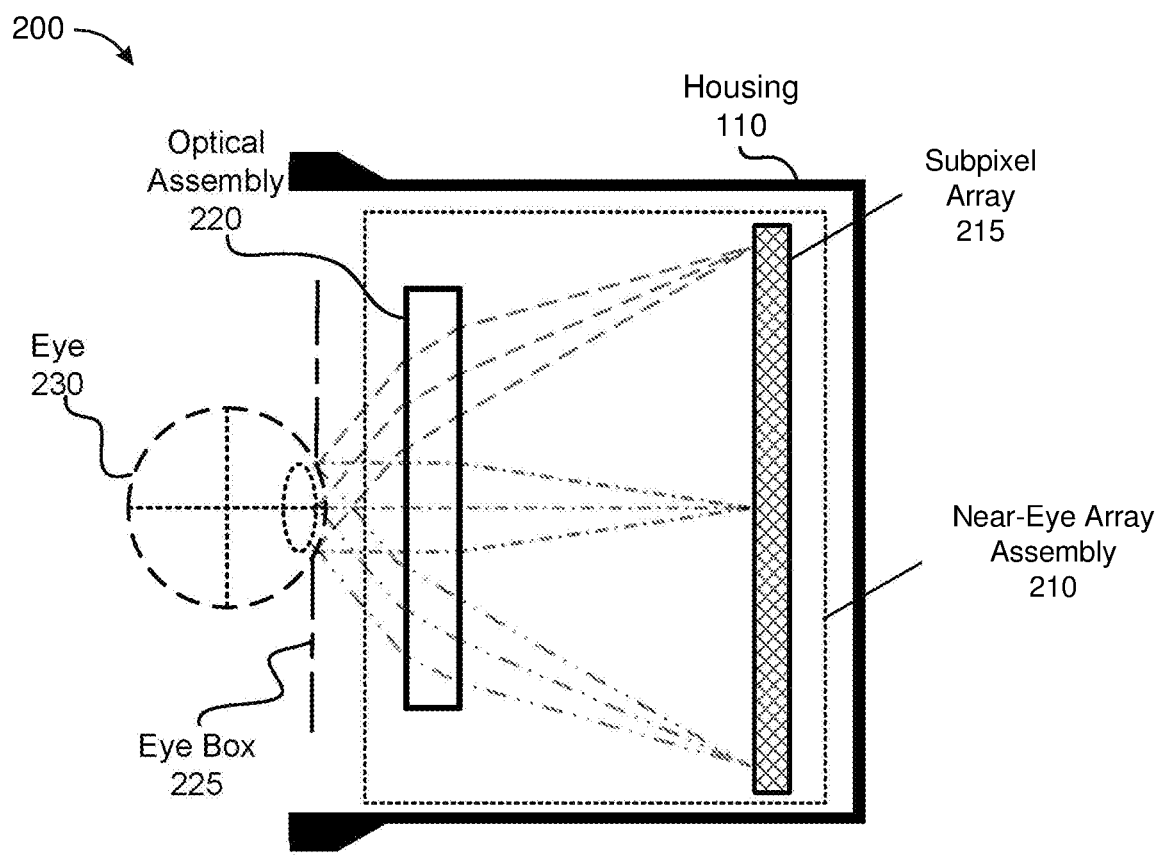
FIG. 2 is a cross-sectional schematic of a portion of a front section of an example HMD, in accordance with some embodiments.

FIG. 2 is a cross-sectional view 200 of the housing 110 of the HMD device 102 shown in FIG. 1, in accordance with one or more embodiments. As shown in FIG. 2, the HMD device 102 may include a housing 110 that houses a near-eye array assembly 210 that may include a subpixel array 215 and an optical assembly 220. The near-eye array assembly 210 may be so constructed herein to increase resolution and/or brightness of light output by the near-eye array assembly 210, e.g., by rapidly moving the subpixel array 215 and/or one or more components of the optical assembly 220. In some embodiments, the near-eye array assembly 210 may include a two-dimensional subpixel array 215 that operably emits light being collimated by a lens system of the optical assembly 220 (not shown in FIG. 2). However, other architectures of the near-eye array assembly 210 may be possible. The subpixel array 215 and the optical assembly 220 together provide light to an eye box 225. The eye box 225 is a region in space that is occupied by a user's eye 230. For purposes of illustration, FIG. 2 shows a cross section 200 associated with a single eye 230, but another optical assembly 220, separate from the optical assembly 220, provides altered light to the other eye of the user. The subpixel array 215 may emit light toward the optical assembly 220. In various embodiments, the subpixel array 215 may include a single array or multiple arrays (e.g., a subpixel array or multiple arrays for each eye of a user). Examples of the subpixel array 215 may include: a liquid crystal array (LCD), an organic light emitting diode (OLED) array, an inorganic light emitting diode (ILED) array, an active-matrix organic light-emitting diode (AMOLED) array, a transparent organic light emitting diode (TOLED) array, an array of quantum dots or of quantum rods, some other array, a projector, or some combination thereof. In some examples, subpixel array 215 may include or may be utilized with a backlit system in which the light to each subpixel may be provided by one or more lasers and a laser-light-to-subpixel distribution system such as one or more MEMS arrays.

In some embodiments, the near-eye array assembly may be incorporated into an HMD, such as HMD 100 of FIG. 1. The HMD may project content to a user wearing the HMD. The HMD may be part of an artificial reality system. The array of the near-eye array assembly may be configured to emit light. The optical assembly of the array assembly may be further configured to direct the light to an eye box of the HMD corresponding to a location of a user's eye.

A near-eye array assembly presented in this disclosure, such as the example presented in FIG. 2, and may include a subpixel array 215, an optical assembly 220, the latter of which may include a scanning assembly. The subpixel array 215 may be configured with a subpixel array operable to emit light. The optical assembly 220 may be configured to provide optical correction to the light, in the form of a lateral shift in the direction of the light, and then direct the light toward an eye box 225 of a user's eye 230. An eye box 225 may be defined as a region where an entrance pupil of a human eye may be located to perceive an acceptable quality image produced by the downstream viewing optics. In some embodiments, the subpixel array 215 and/or optical assembly 220 may be moved rapidly, e.g., by the scanning assembly, to increase resolution and/or brightness of the light output by the near-eye array assembly. The subpixel array 215 may include several components collectively referred to as the array system. Such components may be the emissive array itself, in addition to the circuitry which allows control of the individual subpixels and any other functions of the array. An additional component may include storage media, which may be used, in some embodiments, for temporary storage of subframes prior to being engaged to illuminate the specified sets of emissive subpixels.

A subpixel array 215, which may be densely-populated, and/or one or more components of the optical assembly 220 optically coupled to the array, may be moved in a manner such that light from a given subpixel overlays light from another subpixel, thereby causing each subpixel location to function as a subpixel of the same size enhancing a perceived array resolution at the eye box. Accordingly, the light from one pixel or subpixel may be optically manipulated to appear to a viewer as if the light originated at a different location.

In some embodiments, the near-eye array assembly may be incorporated into an HMD. The HMD may project content to a user wearing the HMD. The HMD may be part of a virtual or artificial reality system. The array of the near-eye array assembly may be configured to emit light. The optical assembly of the array assembly may be further configured to direct the light to an eye box of the HMD corresponding to a location of a user's eye.

The subpixel array 215 may also include an aperture, a Fresnel lens, a convex lens, a concave lens, a diffractive element, a waveguide, a filter, at least one polarizer, a diffuser, a fiber taper, a reflective surface, a polarizing reflective surface, or any other suitable optical element that affects the light emitted from the subpixel array 215. In some embodiments, the subpixel array 215 may have one or more coatings, such as anti-reflective coatings. More details about architecture of the subpixel array 215 and operation of the subpixel array 215 within the near-eye array assembly 210 are provided in conjunction with FIG. 3.

The optical assembly 220 may receive light emitted from the subpixel array 215 and directs the light to the eye box 225 of the user's eye 230. The optical assembly 220 may also magnify the received light, correct optical aberrations associated with the light, and the corrected light may be presented to a user of the HMD 100. In some embodiments, the optical assembly 220 may include a collimation element (lens) for collimating beams of light emitted from the subpixel array 215. At least one optical element of the optical assembly 220 may be an aperture, a Fresnel lens, a refractive lens, a reflective surface, a diffractive element, a waveguide, a filter, and/or any other suitable optical element that affects light emitted from the subpixel array 215. Optical assembly 220 may also possess one or more refractive elements in the form of a lateral-light-shifting optic configured with at least one mechanical degree of freedom to displace light laterally.

Moreover, the optical assembly 220 may include combinations of different optical elements. In some embodiments, one or more of the optical elements in the optical assembly 230 may have one or more coatings, such as anti-reflective coatings, dichroic coatings, polarizing coatings, etc. Magnification of the image by the optical assembly 220 allows elements of the subpixel array 215 to be physically smaller, weigh less, and consume less power than larger arrays. Additionally, magnification may increase a field-of-view (FOV) of the projected media. For example, the FOV of the projected media is such that the projected media may be presented using almost all (e.g., 110° diagonal), and in some cases, all of the user's field-of-view. In some embodiments, the optical assembly 220 may be designed so its effective focal length is larger than the spacing to the subpixel array 215, which magnifies an image projected by the subpixel array 215. Additionally, in some embodiments, the amount of magnification may be adjusted by adding or removing optical elements. More details about the optical assembly 220 and operation of the optical assembly 220 within the near-eye array assembly 210 are described in conjunction with FIG. 3.

In some embodiments, the housing 110 may further include an eye tracking system (not shown in FIG. 2) that determines pupil tracking information for the user's eye 230. The determined eye tracking information may include information about a position (including orientation) of the user's eye 230 in the eye box 225, i.e., information about an angle of an eyegaze. In one embodiment, the eye tracking system may illuminate the user's eye 230 with structured and unseen light. The eye tracking system may use locations of the reflected structured light in a captured image to determine the position of the user's eye 230. In another embodiment, the eye tracking system may determine the position of the user's eye 230 based on magnitudes of light captured over a plurality of time instants.

In some embodiments, the housing 110 may further include a varifocal module (not shown in FIG. 2). The varifocal module may adjust focus of one or more images displayed on the subpixel array 215, based on the eye tracking information obtained from the eye tracking system. In one embodiment, the varifocal module may adjust focus of the displayed images and mitigates vergence-accommodation conflict by adjusting a focal distance of the optical assembly 220 based on the determined eye tracking information. In other embodiments, the varifocal module may adjust focus of the displayed images by performing foveated rendering of the one or more images based on the determined eye tracking information.

Figure 3:
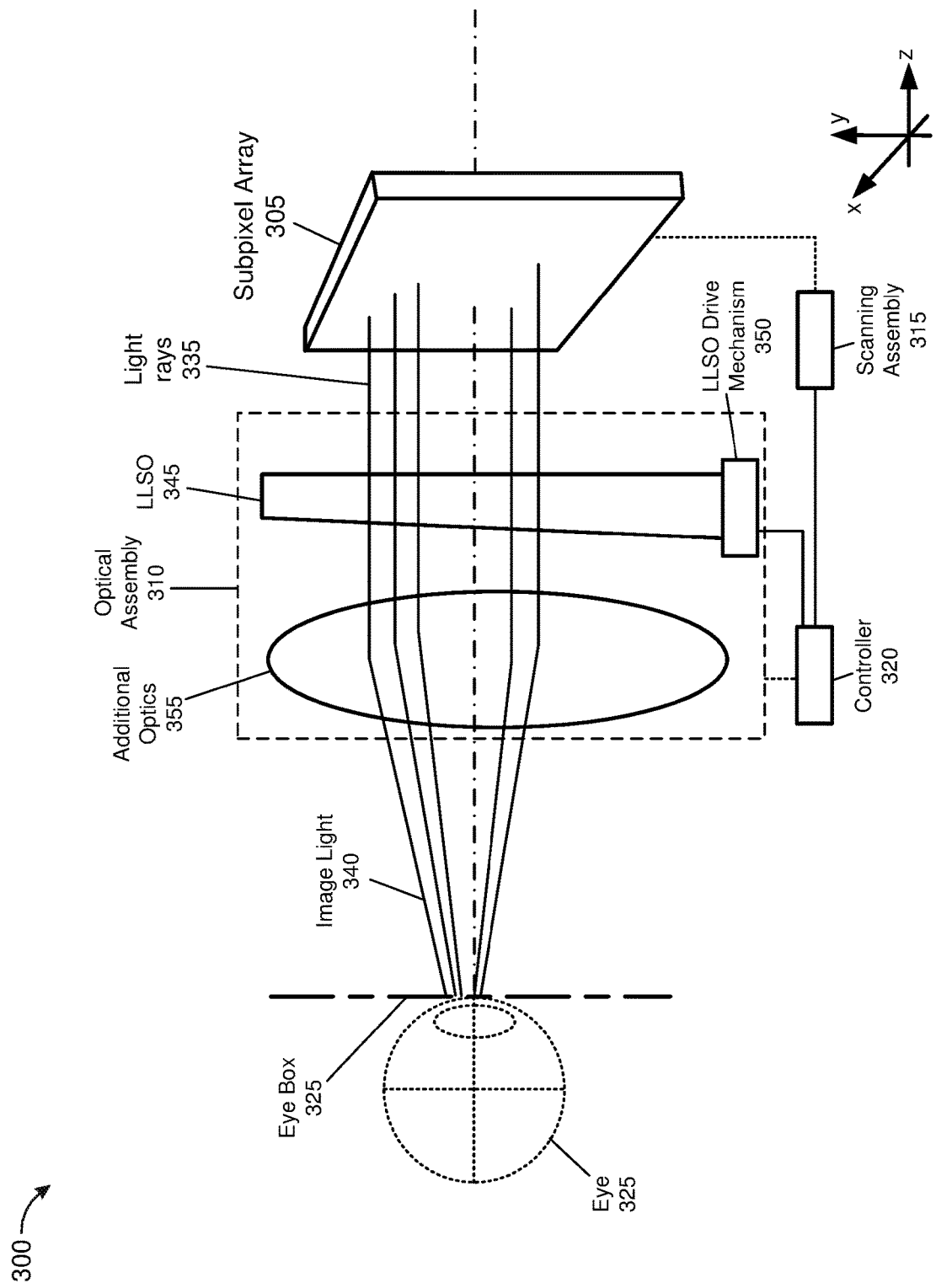
FIG. 3 is a cross-sectional schematic that depicts a portion of an exemplary near-eye array assembly, in accordance with some embodiments.

FIG. 3 illustrates additional detail of an example near-eye array assembly 300, in accordance with one or more embodiments. The near-eye array assembly 300 may be configured herein to increase resolution and/or brightness of light output by the near-eye array assembly 300. The near-eye array assembly 300 may include a subpixel array 305, an optical assembly 310, a scanning assembly 315 coupled to at least one or both of the subpixel array 305 and the optical assembly 310, and a controller 320 coupled to the scanning assembly 315. The near-eye array assembly 300 may be part of the HMD 100 in FIG. 1. Furthermore, the near-eye array assembly 300 may be part of an HMD implemented as an eyeglass-type platform. In this case, the subpixel array 305 of the near-eye array assembly 300 may be also implemented as a waveguide-based array.

The near-eye array assembly 300 may be an embodiment of the near-eye array assembly 210 in FIG. 2; the subpixel array 305 may be an embodiment of the subpixel array 215 in FIG. 2; and the optical assembly 310 may be an embodiment of the optical assembly 220 in FIG. 2. The subpixel array 305 may emit or may be operable to emit light, e.g., based in part on controller instructions from the controller 320. In one embodiment, the subpixel array 305 may be implemented as an OLED array. In another embodiment, the subpixel array 305 may include quantum dots or rods. In another embodiment, the subpixel array 305 may be implemented as an LED array. In additional embodiments, one or more lasers may illuminate subpixels from behind, and colored light may be produced by a linear combination of light from a plurality of lasers, or a single laser may excite specific phosphor coatings present in each subpixel. Additionally, or alternatively, subpixel array 305 may be implemented as any suitable type of emissive display array, without limitation.

The optical assembly 310 may control a field of view (FOV) at an eye box 325 of an eye 330 and may direct a plurality of light rays 335 of light emitting from the subpixel array 305 toward the eye box 325. In general, the subpixel array 305 may be implemented herein to have a first resolution of pixels. In accordance with at least one embodiment, the scanning assembly 315 may be configured to shift directions of the light rays 335 in accordance with controller instructions (e.g., provided by the controller 320) such that a virtual array is projected to the eye box 325, wherein the virtual array (not shown in FIG. 3) has a second resolution greater than the first resolution of the subpixel array 305. Thus, a resolution of light 340 presented to the eye box 325 may be greater than that of the light rays 335. In addition, a level of brightness (intensity) of the image light 340 at the eye box 325 may be increased relative to a level of brightness of the light rays 335 being emitted from the subpixel array 305. In an exemplary embodiment, the scanning assembly 315 may be configured to shift a direction of at least one of the light rays 335 in accordance with the controller instructions, wherein the second resolution of the virtual array presented to the eye box 325 may be increased by at least one virtual pixel relative to the first resolution of the subpixel array 305.

In some embodiments, the optical assembly 310 may include one or more electro-optical elements as additional optics 355. In one or more embodiments, the one or more electro-optical elements of the optical assembly 310 may include one or more electro-optical liquid deformable surfaces. Operation of the one or more electro-optical elements in the optical assembly 310 may be controlled based in part on, for example, the controller instructions from the controller 320 to shift the directions of the light rays 335 emitted from the subpixel array 305 to increase resolution and/or brightness of the image light 340 at the eye box 325.

Figure 4:
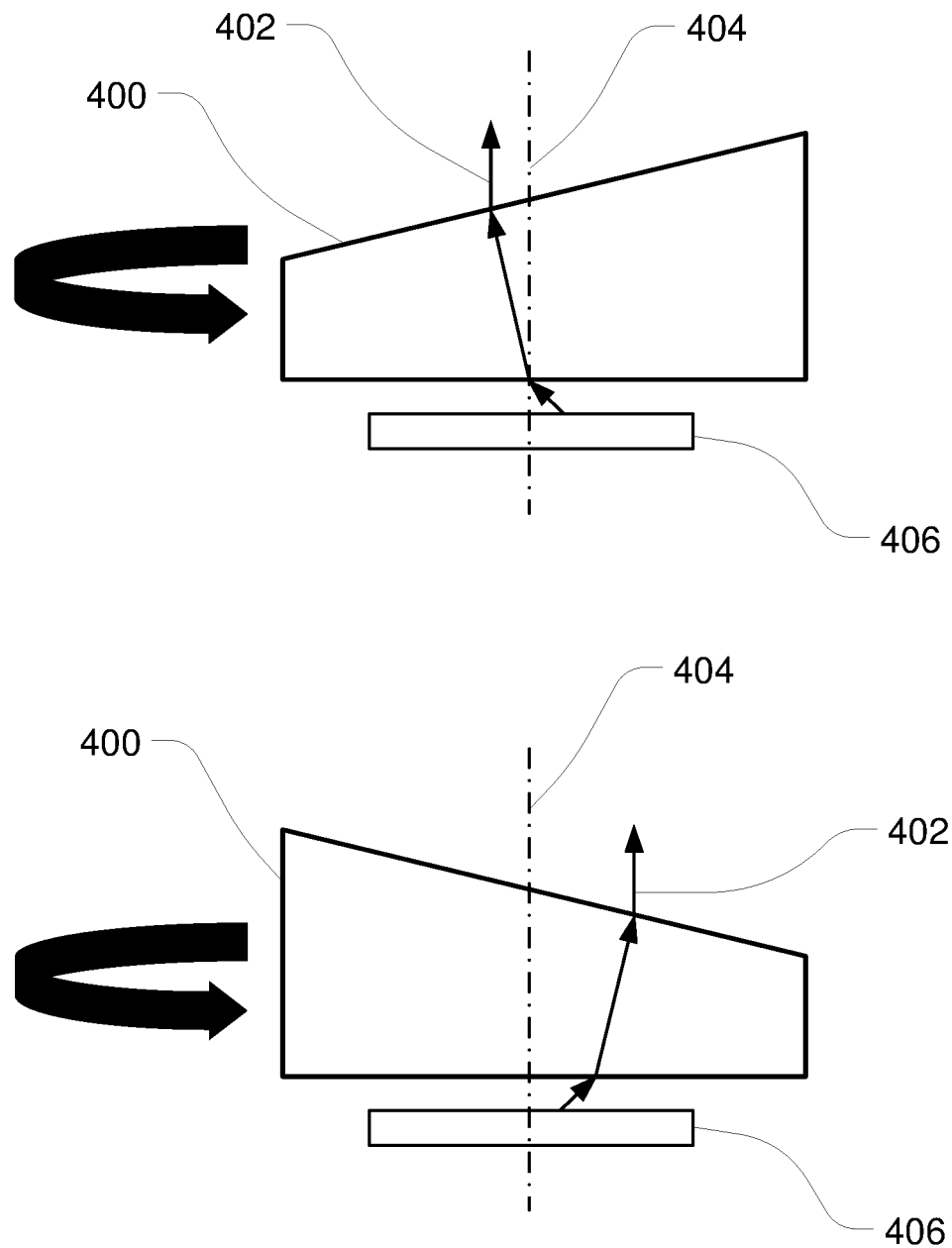
FIG. 4 is a cross-sectional side view of an example lateral-light-shifting optic (LLSO, light deviator) for altering a light path disposed over a light-emitting region, in accordance with some embodiments.

In some embodiments, the optical assembly 310 may include at least one LLSO 345 (see, e.g., an exemplary LLSO shown in FIG. 4). In one or more embodiments, as will be described in greater detail below, the LLSO 345 in the optical assembly 310 may be so configured as to rotate about an axis perpendicular to or tilted relative to the plane of the subpixel array 305. The rotation characteristics of the LLSO 345 (speed, location, etc.) and/or the tilt and/or pivot of the LLSO 345 may be controlled based in part on, for example, the controller instructions from the controller 320.

By rotating or manipulating the LLSO 345 in the optical assembly 310 about an optical axis of the optical assembly 310 (e.g., based in part on the controller instructions from the controller 320), the directions of the light rays 335 emitted from the subpixel array 305 may be laterally translated with respect to an undeviated ray, thereby increasing resolution, brightness, and/or color of the projected light 340 at the eye box 325. In some embodiments, the LLSO 345 may include two separate rotating LLSOs (light deviators), either co-rotating or rotating separately. Each LLSO or light deviator may be separately controlled by the controller 320 or sub-systems of the controller 320. In other embodiments, the LLSO 345 may have the function to tilt and/or to pivot. A drive mechanism 350 may perform the variety of motional conveyances to the LLSO 345, such as rotation, tilt, and/or pivot. The controller 320 may provide to the drive mechanism 350 instructions to the LLSO 345 in order that the LLSO 345 is in a specific position when light from a given subpixel of the subpixel array 305 is instructed by the controller 320 to be emitted.

In some embodiments, the scanning assembly 315 may be designed to shift the directions of the light rays 335 emitted from the subpixel array 305 by rotationally and/or laterally shifting a relative position of the subpixel array 305 to the optical assembly 310 in accordance with the controller instructions (e.g., from the controller 320) at each time interval of a plurality of time intervals in a time period of scanning the subpixel array 305. The scanning assembly 315 may include at least one positioner coupled to the subpixel array 305 for rapidly moving the subpixel array 305 and/or at least one component (e.g., additional optics 355) of the optical assembly 310 along a lateral dimension during the scanning, thereby shifting the relative position of the subpixel array 305 to the optical assembly 310 and increasing resolution and/or brightness of light at the eye box 325. Additional optics 355, which are part of the optical assembly 310, may include optical components that direct the laterally shifted light emerging from the LLSO 345 towards the eye box 325. These additional optics 355 may be transmissive or reflective, or a combination of both.

In some embodiments, at least one positioner of the scanning assembly 315 may be implemented as a micro-actuator configured to move the subpixel array 305 and/or the at least one component of the optical assembly 310, based in part on, e.g., the controller instructions from the controller 320, thereby increasing resolution and/or brightness of the projected light 340 at the eye box 325. Such a micro-actuator might be a piezoelectric or magneto-strictive device.

Furthermore, in one embodiment, the at least one positioner of the scanning assembly 315 may be designed to rotate, to tilt, or to pivot, or to reflect, or any combination of these movements, the at least one LLSO 345 of the optical assembly 310 about an axis of the optical assembly 310 (e.g., based in part on the controller instructions from the controller 320) to shift the directions of the light rays 335 emitted from the subpixel array 305, thereby increasing resolution and/or brightness of the projected light 340 at the eye box 325.

In some other embodiments, the at least one positioner of the scanning assembly 315 may be configured to shift the subpixel array 305 and/or the at least one component of the optical assembly 310 and to rotate at least one other component of the optical assembly 310 during a time period (or control in some other manner operation of the other component of the optical assembly 310), thereby shifting directions of the light rays 335 emitted from the subpixel array 305 and increasing resolution and/or brightness of the projected light 340 at the eye box 325. The controller 320 may generate controller instructions for one or more components of the near-eye array assembly 300. The subpixel array 305 may emit the plurality of light rays in accordance with the controller instructions from the controller 320. In some embodiments, the controller 320 may be coupled, via the scanning assembly 315, to at least one of the subpixel array 305 and the optical assembly 310. Thus, the scanning assembly 315 may operate as an electrical or electro-mechanical interface between the controller 320 and at least one of the subpixel array 305 and the optical assembly 310.

In other embodiments, when the subpixel array 305 may be implemented as a densely-populated array, the controller 320 may instruct, based in part on the controller instructions, the scanning assembly 315 to translate the subpixel array 305 and/or the optical assembly 310 linearly along orthogonal paths (i.e., lateral dimensions) using at least one positioner of the scanning assembly 315 to effectively shift the subpixel array 305 and/or the optical assembly 310 around in a circular path during a time period of translational movement. In this manner, the densely-populated subpixel array 305 may be presented at the at the eye box 325 as the virtual array having an increased subpixel/pixel resolution.

Furthermore, in an embodiment, the controller 320 may be configured to instruct the at least one positioner of the scanning assembly 315 to manipulate movements of the LLSO within the optical assembly 310 about an axis of the optical assembly 310 to shift the directions of the light rays 335, based in part on the controller instructions, thereby increasing resolution and/or brightness of the projected light 340 at the eye box 325. In another embodiment, the controller 320 may instruct the at least one positioner of the scanning assembly 315 to manipulate a collimation element of the optical assembly 310 about an axis of the optical assembly 310 to shift the directions of the light rays 335, based in part on the controller instructions, thereby increasing resolution and/or brightness of the projected light 340 at the eye box 325.

In one or more embodiments, the controller 320 may directly interface with one or more components of the optical assembly 310 (e.g., one or more electro-optical liquid deformable surfaces). The controller 320 may be then configured to control operation of the one or more electro-optical elements in the optical assembly 310 based in part on the controller instructions to shift the directions of the light rays 335 emitted from the subpixel array 305, thereby increasing resolution and/or brightness of the projected light 340 at the eye box 325. For example, the controller 320 may control, based in part on the controller instructions, a level of voltage applied to each electro-optical liquid deformable surface in the optical assembly 310 to change a refractive index of that surface and shift the directions of the light rays 335 emitted from the subpixel array 305. In other embodiments, the controller 320 may be configured to control, based in part of the controller instructions, operation of the scanning assembly 315 (e.g., of the at least one positioner in the scanning assembly 315) to control a brightness of a virtual pixel of the virtual array at the eye box 325 based on a number of times over a time period a location at the eye box 325 corresponding to the virtual pixel receives one or more light rays of the plurality of light rays 335 associated with a particular subpixel color emitted from the subpixel array 305.

Furthermore, in some embodiments, when the subpixel array 305 is implemented as a sparsely populated array, the controller 320 may instruct the at least one positioner of the scanning assembly 315 during a time period to control operation of at least one component (e.g., LLSO 345 and/or additional optics 355, such as a collimation element or electro-optical element) of the optical assembly 310 as well as to move rapidly the subpixel array 305 and/or at least one other component of the optical assembly 310 along a lateral dimension, based in part on the controller instructions. In this manner, the sparsely-populated subpixel array 305 may be presented at the at the eye box 325 as the virtual array having an increased subpixel/pixel resolution. An example of a sparsely-populated array would be a smart pixel array.

In other embodiments, when the subpixel array 305 may be implemented as a densely-populated array, the controller 320 may instruct the at least one positioner of the scanning assembly 315 during the time period to control operation of at least one component (e.g., LLSO, collimation element, or electro-optical element) of the optical assembly 310 as well as to translate rapidly the subpixel array 305 and/or at least one other component the optical assembly 310 linearly along orthogonal paths to shift effectively the subpixel array 305 and/or the optical assembly 310 around in a circular path, based in part on the controller instructions. In this manner, the densely-populated subpixel array 305 may be presented at the at the eye box 325 as the virtual array having an increased subpixel/pixel resolution.

In some embodiments, for a multi-chromatic sparsely-populated subpixel array 305, the scanning may be sufficiently fast such that the eye 330 integrates light from three different neighboring subpixels of different color channels that occupy the same subpixel position (e.g., upper-left corner 504 of FIGS. 5A-D) in a cell at different time instants. The three different subpixels occupying the same subpixel position in the cell at different time instants may form a virtual RGB subpixel of the same size as a single-color-channel subpixel. In this manner, a virtual RGB subpixel representing a white pixel may be provided at a subpixel position of the sparsely-populated subpixel array 305. In some embodiments, for the sparsely-populated subpixel array 305, the eye may 330 integrate light from three different neighboring subpixels that occupy a subpixel position (e.g., upper-left corner) in a pixel at different time instants such that a brightness of light emitted from the subpixel position is increased. In some embodiments, a single emissive element may not operably emit more than a single color, and therefore, multiple emissive elements may be used to produce each color pixel, with the size of an array pixel being equal to the sum of the sizes of its constituent subpixels.

Subpixel array 215 in FIG. 2 and/or subpixel array 305 in FIG. 3 may include any suitable emissive array technology, which is subpixel addressable. For example, subpixel array 215 may include pixels/subpixels formed of light-emitting diodes (LEDs), organic light-emitting diodes (OLEDs), quantum dots, quantum rods, plasma cells, electrophoretic array elements, liquid crystal array (LCD) components, electrowetting array elements, cathode ray tube (CRT elements), and/or any other suitable image pixel technology. Backlit display or projecting systems may also be viable.

In alternative embodiments, one or more lasers may illuminate subpixels from behind and colored light may be produced by a linear combination of light from a plurality of lasers, or a single laser may excite specific phosphor coatings present in each subpixel. Additionally or alternatively, subpixel array 305 may be implemented as any suitable type of emissive display array, without limitation.

Subpixel arrays 215 and 305 may be designed to create colors having a wavelength between subpixels operably emitting the highest wavelength light and subpixels operably emitting the lowest wavelength light. Thus, combining light from subpixels with differing spectral properties may be used to produce a broad spectrum of colors visible to a viewer. In some examples, spatial subpixel averaging may produce colors visible to a user by using subpixels in close spatial proximity to enable a pixel to appear to emit a single, variable color.

In some embodiments, variable colors may be produced in a subpixel array using temporal subpixel averaging. Temporal subpixel averaging may produce colors visible to a user by emitting multiple colors of light from a single subpixel location at different moments in time in rapid succession. The human eye may perceive the rapidly changing colors as a single color emitted from the subpixel location. For example, if a subpixel location flashes red, green, and blue rapidly (e.g., as in temporal multiplexing), the human eye may perceive the subpixel as a white. In some embodiments, additional subpixels may be added to subpixel array 215 and/or 305 to increase the brightness and/or extend the color gamut of the subpixel array 215 and/or 305.

According to various embodiments, a subpixel layout designed for spatial subpixel averaging may include a dense packing of subpixels to maximize resolution. The subpixel layout may further vary the size and shape of subpixels to minimize the sum of the subpixel areas that make up a single pixel. Layout optimization for temporal subpixel averaging, as described herein, may result in very different subpixel layouts compared to spatial subpixel averaging. When optimizing for temporal subpixel averaging, a subpixel may be the same size, shape, and orientation as every other subpixel. This may allow for effective spatial overlap of subpixels through simple translation of the optical path or color-selecting layer, without the need for rotation or other transformations which require more complex mechanisms. In addition, straight lines may exist along which every subpixel color may be found with minimal unused space or repetition to allow full color overlap via translation along a single axis. For example, the linear path may be contiguous with one of each subpixel. In some examples, contiguous objects or regions may have a common border or may be adjacent or touching one another. For example, a contiguous path of subpixels may include each subpixel with no additional subpixels in the path between the subpixels. Similarly, circular paths, substantially circular paths, and/or other circuitous paths (e.g., rectangular paths, hexagonal paths, etc.) may exist along which every subpixel color may be found with minimal unused space or repetition. For example, a circular path may not have a diameter greater than the sum of the lateral dimensions of the subpixels of every subpixel color. In some examples, the lateral dimensions of a subpixel may refer to the spacing between centers of a subpixel. In some examples, the actual lateral dimensions of a light-emitting element of a subpixel may be less than the spacing between the subpixels.

According to some embodiments, another technique suitable for temporal subpixel averaging may include using the LLSO to alter the light path laterally from subpixels so that colors of multiple subpixel types appear to emit from the same subpixel location without the array device physically moving. FIG. 4 illustrates an example of a rotating prismatic LLSO 400 that may alter a light path 402 from an exemplary light-emitting region of an array 406 by one or more subpixel widths, resulting in a subpixel location that may include light from multiple adjacent subpixel types disposed along a curved, e.g., circular, path centered about and/or surrounding the subpixel location.

In the top example shown in FIG. 4, exemplary light path 402 emits from a location to the left of axis 404, while in the lower example, exemplary light path 402 emits from a location to the right of axis 404. The source of light path 402 has not changed, but the emitted location varies, in this example, in a circular path in conjunction with rotation of prism LLSO 400. If the time it takes to travel one full rotation of the prism LLSO 400 equals the time to transition through the colors of light from a subpixel, a single subpixel location may appear to emit the colors of light during one rotation of the prism LLSO 400. The prism LLSO 400 may be utilized with any suitable subpixel layout, including the exemplary subpixel layouts disclosed herein.

The LLSO may be, in part, prismatic in profile, such as a regular triangular prism. In alternative embodiments, the prism may be one of a polarizing prism, a Wollaston prism, an amici roof prism, a dove prism, or a pair of Risley prisms. In some alternative or additional embodiments, one or both surfaces of the prism may have optical power. In some alternative or additional embodiments, the optical power may be anamorphic. In some embodiments, the LLSO may be a tilted optical window (e.g., a tilted or tiltable glass plate or lens).

An alternative embodiment for the LLSO is an electrically switchable liquid crystal grating. Optical diffraction gratings may be used in technologies such as multiplexing and processing optical signals. The latter including optical interconnections, beam steering, and sensor array interrogation. In addition, they provide protection to sensors from a hostile environment. Liquid crystals (LC), whose refractive indices may be modulated by an externally applied voltage, enable a design of very high efficiency phase gratings. Moreover, for such gratings, optical properties such as birefringence may be dynamically manipulated. Switchable diffraction gratings may be based, for example, on polymer-stabilized dual frequency nematic liquid crystals. An alternative would be polymer-stabilized cholesteric gratings.

An LC switchable blazed grating may have the following composition. The substrate of the device may be a form of acrylate which is on top of a transparent metal (e.g., indium tin oxide ITO) coated glass. A transparent cover glass, also perhaps of ITO, is place on top of the blazed grating, with a separation between these layers of a few microns. A thin layer of nematic or another appropriate LC may be sandwiched in between. The ITO layer deposited underneath the grating and another ITO layer coated on the bottom surface of the cover plate may be used to electrically drive the LS to change the phase information of the illuminating light. The refractivity of the nematic or another appropriate LC for extraordinary light may be altered by a driving voltage. With no electric field present, refractive indices of the substrate and the LC are different, and strong diffraction is produced by the index-phase difference in the off state. Upon application of an electric field the refractive index of the LC is decreased. At a certain driving voltage, index matching occurs between the acrylate and the LC. Thus, the device is either on or off, which provides, respectively undeflected or deflected light. For multiple angles, stacks of these units perhaps with different grating periods may be used. Different driving conditions for each stack, multiple steering angles may be produced.

Two-dimensional switchable liquid crystal blazed gratings (e.g., cholesteric) may be achieved by applying an electric field to a cholesteric at the optimum field conditions (frequency and voltage) and cholesteric pitch to cell thickness ratio. Alternatively, a polymer-based liquid crystal blazed grating having a prismatic polymer microstructure may be used as a light deviator, such as an LLSO. A stack of liquid crystal switchable blazed gratings (LCSBGS) may allow a plurality of deflection angles.

Thus, a light deviator, such as an LLSO, or a plurality of LLSOs, may possess a plurality of degrees of freedom allowed by rotation, tilt, pivot, and those that may be available from a liquid crystal switchable grating stack including voltages and frequencies for each layer of a stack, which includes at least one reflection control. These functions would be under the control of the controller 320.

An LLSO providing lateral translation of light emitted from a single subpixel in a subpixel array (such as the one in FIG. 4) may provide to a viewer an impression of a curve of light and not a single unresolvable point of light. If the LLSO is a regular prism, as depicted in FIG. 4, then the curve may appear to be a circular ring.

Figure 5:
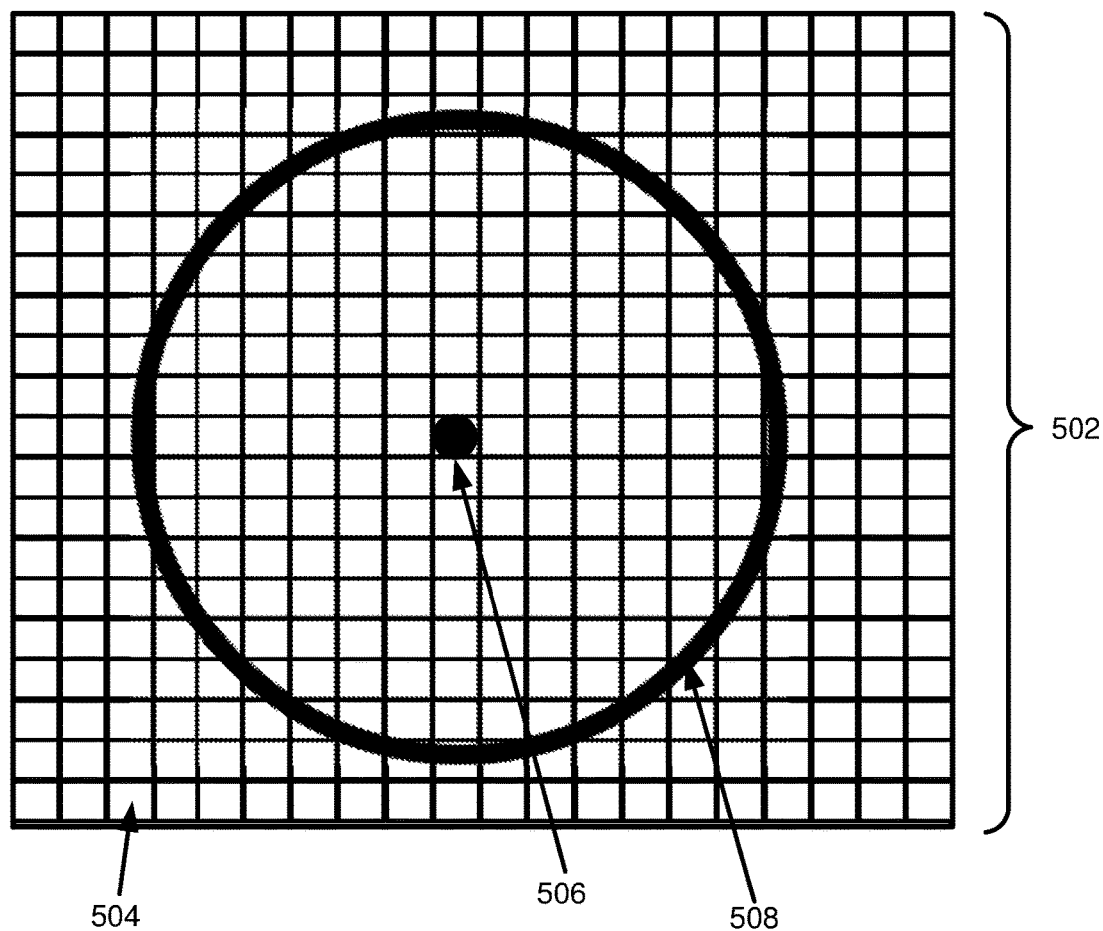
FIG. 5 is view of an exemplary array of subpixels demonstrating lateral translation of light by an LLSO (i.e., light deviator), in accordance with some embodiments.

An example is given in FIG. 5, which illustrates an exemplary system 500 in which a center subpixel 506 of an array 502 of individual subpixels 504 is operably illuminated, and during the rotation of the LLSO, the refracted and thus laterally shifted light to the viewer appears as a curve of light 508. This may be the case if a complete cycle or rotation of the LLSO is less than the integration time of the typical eye, usually <300 ms. The LLSO used in the generation of this exemplary curve of light may be that of a rotating regular prism, possessing no optical power.

As has been alluded to previously, the subpixel described hereinabove may be one of any of at least three subpixels, and in some examples four or more subpixels, included in emissive arrays. Each of these subpixels may emit spectral distributions that appears to be one of the colors of red, green, blue, and white. Subpixels may be present in some embodiments that emit additional or alternative colors. In at least one embodiment, each subpixel of a display may emit the same color, where, for example, the display is part of a multi-display system having multiple displays that each emit a different color and the light emitted by the multiple displays is combined to form a single image.

The light emitted from a given subpixel (i.e., a generator subpixel) may be mapped to any of the locations of a unique set of specific subpixels, referred to, for example, as the generator subpixel's set of virtual subpixel locations. The uniqueness of that set of virtual subpixel locations may depend on the design of the light deviator/LLSO and the space (i.e., allowable) of its movements. The elements of that set may all have the same property such that light from a first generator subpixel may be translocated or shifted to any virtual subpixel location within that set. Moreover, when light from the first generator subpixel is translated laterally to one or more virtual subpixel locations (e.g., using a light deviator), then the first generator subpixel may not be a member of that set of virtual subpixel locations. The first generator subpixel may, however, be located at a virtual subpixel location during at least one sub-frame when, for example, the location of the first generator subpixel is shifted by physically moving the light emitting array (e.g., using one or more actuators) or in configurations in which light from the first generator subpixel is periodically translated (e.g., by a switchable liquid crystal grating). Which member(s) of that set of virtual subpixel locations becomes the virtually illuminated subpixel may depend on the timing of generator subpixel illumination with an appropriately determined position of the LLSO.

The generator subpixel may thus have the ability to mimic, replace, and/or augment the light being emitted by any subpixel within the set of subpixels that share a virtual subpixel location with the generator subpixel. With this type of mapping, the light from the generator subpixel may contribute to the intensity and/or color of a subpixel at a subpixel virtual location that is positioned to receive light from the generator subpixel. Advantageously, should a subpixel that shares a virtual subpixel location with one or more generator subpixels be dead or weak, then the light from the one or more generator subpixels may substitute for or contribute to that which the dead/weak subpixel cannot produce. The number of virtual subpixel locations per subpixel may be the same across the array. However, locations near edges or corners of the array may have fewer generator subpixels that can contribute to them.

With some embodiments of the light deviator or LLSO optical designs, the set of virtual subpixel locations may form a ring or a thin annulus. In alternative embodiments of the light deviator optical design, the set of virtual subpixel locations may form a non-circular curve. The non-circular curve may take the shape of an ellipse in the case of an anamorphic light deviator. Additionally or alternatively, embodiments may allow for a family of generator subpixels centered on a subpixel, which may not itself be a generator subpixel of that family. Such embodiments may be produced by a combination of anamorphic optical design and possible movements of the light deviator or LLSO including rotation, tilt, pivot, and/or reflection(s).

The size and characteristics of the curve as seen by a viewer is dependent primarily on optical properties of the light deviator/LLSO and on the space of allowable movements of the light deviator (LLSO). General optical properties may include the shape of the LLSO design (thickness, prismatic angle, refractivity, optical power, anamorphic, etc.). In the case of a regular prism LLSO, these optical properties may include the distance of the operably illuminated subpixel from the LLSO, the thickness of the LLSO, the apex angle of the LLSO, and the refractivity of the glass or substrate of the LLSO. As the refractivity of the LLSO is often dispersive, it follows that the extent of the distance of the curves from the generator subpixel (diameter, width) produced for each of the different subpixel colors, may vary slightly between disparate colors. However, given that even light from a subpixel seen by a viewer may not be resolvable with typical foveal resolution, the curves from adjacent subpixels each emitting differing colors may be seen to be essentially co-incident. In some embodiments, where the mechanical degrees of freedom of the LLSO may be greater than one, a supra-subpixel width of the curve may be possible.

In various embodiments, an image may be represented by a set of subframes $SF_j$. Each subframe may be generated by illuminating a set of subpixels using a set of predetermined parameters derived from processing a set of input data which may lead to displaying an image via temporal multiplexing to a viewer. Input data to a controller (e.g., controller 320 in FIG. 3) may include an image, instructions for generating an image, or portions thereof, a computer-generated model, or a sequence of images such as might be found in an animated GIF, for example. The image format may be a bitmap, a jpg, a png, a svg, tiff, or any other suitable pixel formatted image or data.

Each subframe $SF_j$ may be derived from $SF_j = \Sigma_i^{N_j} f(p_{ij} + \Delta p_{ij}, t_{ij} + \Delta t_{ij}, I_{ij}, D_{ij}, x_{ij} + \Delta x_{ij}, y_{ij} + \Delta y_{ij})$, where $SF_j$ is the j-th subframe, including a set of $N_j$ subpixels, each i-th subpixel of the $N_j$ subpixels to be illuminated for $SF_j$; where $f$ is a function that represents the various functions of the controller (e.g., controller 320 in FIG. 3), which includes LLSO positioning for the i-th subpixel and illumination of the i-th subpixel using a plurality of parameters. The parameters for the j-th subframe may include: $t_{ij}$=time when the i-th subpixel is illuminated; $D_{ij}$=duration of the i-th subpixel illumination; $(x_{ij}, y_{ij})$ identifies the i-th subpixel by its location within the subpixel array; I=intensity of the i-th subpixel illumination; $p_{ij}$=position of the LLSO for the i-th subpixel; and a set of incremental deviations of the plurality of parameters, the incremental deviations include: $\Delta t_{ij}$=incremental deviation from the time at which the i-th subpixel is illuminated; $\Delta x_{ij}, \Delta y_{ij}$ are incremental deviations defining positional offsets from the i-th subpixel; and $\Delta p_{ij}$=light deviator/LLSO incremental position deviations for the i-th subpixel. The plurality of parameters may be represented as components of a vector $q_{ij}$, and the vector $q_{ij}$ would be at least one of the arguments of the function $f$.

In some embodiments, the positional parameter $p_{ij}$ may have a component related to the rotational or cyclical position of the LLSO, or other time-periodic parameters of the LLSO. In some embodiments, one or more components of the position vector (e.g., the component $p^k_{ij}$) may be cyclical and thus have a period $c^k$ associated with each k-th cyclical component of $p_{ij}$. This may allow for greater efficiency in compensating sub-standard subpixels in that a greater number of compensations for sub-standard subpixels may occur within a smaller number of subframes. In alternative or additional embodiments, the rate of change of any LLSO positional component may be controlled by the controller (e.g., controller 320 in FIG. 3). This may allow for greater efficiency in compensating for sub-standard subpixels in that a greater number of compensations may occur within a preset number of subframes. Other, perhaps non-cyclical, positions of the light deviator/LLSO may be represented by one or more components of $p_{ij}$. The ensemble of positional parameters may be formalized as a vector, where each degree of freedom of the light deviator/LLSO is represented by a component in that vector.

In summary, functions of the array system may include at least: subpixels addressable, illumination of subpixels, and/or duration of subpixel illumination. Optical system functions may include at least: lateral translocation of light, rotation (e.g., rotational position and/or speed), tilt, pivot, reflection control, varifocal adjustment, focus adjustment of light from the array to downstream optics, eye tracking, waveguide control, foveated rendering of one or more images based on eye tracking information, electro-optical deformable surface adjustment, manipulation of individual optical elements in 3D, lateral shifting of the subpixel array, and/or lateral and/or axial shifting of any optical component.

Additionally or alternatively, the described embodiments may be used in conjunction with temporally-multiplexed resolution enhancement and/or redundancy. For example, the same process of splitting images into multiple subframes may be used in various optical applications described herein and the subframe adjustments necessary for each application may be mutually compatible. The subframes of an image may be projected towards a viewer within the integration time of a typical eye, and thus the combination of the information contained in each subframe may appear to be associated with an image. Any suitable number of subframes may be utilized and may range, for example, from one to approximately 32.

A system may be so designed as to generate an image to be viewed by a viewer. Such a system may include a subpixel array system including a plurality of subpixels and an optical system, which may be designed to receive light from at least one subpixel of the subpixel array system and shift laterally the received light by a light deviator/LLSO, and to direct the laterally shifted light towards a viewer. The system may also include a controller, which receives and converts input data into a sequence of instructions to cause the generation of one or more subframes by controlling a plurality of functions of the subpixel array system and of the optical system, each of the one or more subframes including light from a set of subpixels of the plurality of subpixels emitted at a predetermined time and at a predetermined position of the LLSO with respect to at least one of the lateral-light-shifting degrees of freedom of the light deviator/LLSO. An image may then be generated in the visual cortex of a viewer by one or more of the techniques of temporal multiplexing described herein.

Techniques of temporal multiplexing of a display or an array of subpixels may involve creating the impression of an image by rapidly overlapping a sequence of subframes. Such may also include the technique of interlacing, wobulation, and field sequential color. Interlacing is a technique that displays half of the lines of an image in a subframe and the other half in a subsequent subframe. Wobulation is a technique that divides high-resolution images into two half-resolution subframes that may be overlapped with a half-pixel offset. Field-sequential color may segregate the image into monochromatic subframes which may then be displayed. In addition to these, an alternative or additional technique is sequential presentation of the subframes to the display.

The ability to translocate light from a generator subpixel to any member of its set of virtual subpixel locations means that light may appear to emanate from dead or weak (i.e., sub-standard) subpixels. Thus, a first set of subpixels, with standard performance, may provide light to a second set of subpixels, with sub-standard performance. An emissive array of subpixels may be afflicted with a set of sub-standard subpixels. The extent of such afflictions in any given emissive array may vary from a few subpixels to many subpixels. Moreover, the afflictions may be distributed in an emissive array randomly or may be found in clusters. The afflictions for sub-standard subpixels may vary from being completely inoperable, for a variety of reasons, to being partially operable. For the sub-standard subpixels that are partially operable, the afflictions may involve intensity and/or color deficiencies of the emitted light.

The affliction of color deficiency involves the emitted light differing from the "in-spec" norm. An example would be a subpixel designed to emit a particular wavelength or distribution of wavelengths that are perceived by a viewer to be red. It would be 'out-of-spec,' for example, if the median, mean, or modal (hereinafter, mmm) wavelength emitted is sufficiently offset from the desired wavelength as to be discernable by a typical eye. Subpixels that emit blue light may be easier to achieve 'in-spec' or standard performance as the perceived color differences with respect to the designed wavelength may be even greater than, say, green-light emitting subpixels. This is due to the fact that a typical human eye does not easily perceive blue light wavelength shifts, unless they are large.

Not all emissive subpixels produce light with the same spectral distribution. Certain subpixel technologies may produce light of a narrower width and thus smaller variance or average deviation. Common subpixel emission systems, such as LED or OLED, generate spectral distributions in the former category. Phosphor emitters may produce light with a rather broad spectral distribution, which in some cases, produces light that is perceived by a viewer to be colorless, i.e., white.

The deficiencies of sub-standard subpixels may be overcome using one or more techniques described herein. In one embodiment, sub-standard subpixel compensations and input data conversions may be accomplished in at least one subframe. In an additional embodiment, input data may be converted in at least one subframe and sub-standard subpixel compensation may be accomplished in at least one separate subframe. In another embodiment, a portion of input data may be converted during a first subframe and substandard subpixel compensation may be accomplished during a second subframe, during which another portion of the input data is also converted.

In various embodiments, pairs of subframes may be generated. For example, during a first subframe, all or a portion of input data for a frame may be converted, and during a second subframe, compensation for all or a portion of the set of sub-standard subpixels may be accomplished. In some examples, sets of pairs of such subframes may be utilized, where a pair includes one subframe for the input data and one subframe for sub-standard subpixel compensation.

In some examples, pairs of subframes may be generated, where a first set of lines of a first subframe of each pair includes a portion of converted input data and a second set of lines of a second subframe of each pair contains another portion of the converted input data. The two sets of lines may not overlap. For example, the first set of lines may be even-numbered and the lines of the second set of lines may be odd-numbered. Sub-standard subpixel compensation for either the first or second subframe may occur in those lines of the first or second subframe that are not assigned to display any converted input data. Thus, in two subframes, the converted input data and compensation for sub-standard subframes may occur without repetition.

Embodiments for sub-standard subpixel compensation may include, e.g., temporal multiplexing of subframes, which may be equivalent to an apparent averaging of the subframes. In one embodiment, the converted input data, may be distributed amongst several subframes to allow standard subpixels to compensate for sub-standard subpixels. In alternative or additional embodiments, relative positional shifts between subframes may be used in order to provide a compensation mechanism. In some embodiments, some standard subpixels may be used in multiple subframes.

In some embodiments, relative positional shifts may be minor (e.g., <40 subpixels) or they may require larger displacements (>40 subpixels, or more). In some embodiments, a subframe size may cover an area smaller than the full size of the emissive subpixel array and may be only a portion of it. Positional shifts may be determined by a 2D-convolution between at least a portion of the converted input data and a representation of the sub-standard subpixels present in a given emissive array of subpixels.

The following examples, depicted in FIGS. 6-11, may use an exemplary four subframes and may provide a demonstration as to the ability to compensate for sub-standard subpixels in accordance with some embodiments disclosed herein. The positions of arrayed elements shown in each of these figures may be shifted by, for example, laterally shifting light from emissive subpixels to corresponding viewable virtual subpixel locations using a suitable lateral-light-shifting optic (LLSO), as described herein. Additionally or alternatively, the positions of arrayed elements shown in each of these figures may be shifted by physically shifting (e.g., using actuators) an emissive array and/or shifting other optical components with respect to the emissive array, so that the locations of the emissive subpixels used to generate the viewable subpixel elements are physically displaced during successive subframes. Fewer or greater numbers of subframes may be used in any of the examples provided herein, with appropriate adjustments to facilitate the differences. For purposes of illustration, in each example illustrated in FIGS. 6-11, there is a row of four 5 by 5 matrices in which each entry in a 5 by 5 matrix is an emissive subpixel, either standard (fully functioning) or sub-standard (deficient in intensity and/or color). These four matrices, respectively labelled as subframes SFX.1, SFX.2, SFX.3, and SFX.4 (where X represents an example number, in this case 1 to 6, corresponding to FIGS. 6-11, respectively) represents a subframe that may be associated with either converted input or image data, or sub-standard compensation data, or both. The standard subpixels are identified with squares. The sub-standard subpixels are identified with circles. A diagonal line through a square or a circle designates that the subpixel is OFF, while a square or circle with no diagonal line means that the subpixel is ON. Hollow or empty squares or circles are unused subpixels.

Each subpixel may be "populated" by a datum or element from the input data or an image. These data elements are represented, for purposes of illustration, by a set of 4×4 elements which are to be displayed, or sent to an emissive array, in each of FIGS. 6-10. In FIG. 11, a 3×3 subset of the 4×4 elements are configured to be similarly displayed in FIG. 11. These elements represent intensities or data from an image and are designated by labels A . . . P in FIGS. 6-11 (e.g., datum or element A represents an element in the image), with elements A . . . P representing viewable subpixel elements that are formed by light from the identified emissive subpixel elements located in the corresponding matrices shown in each of the subframes. Accordingly, the locations of each of elements A . . . P change within the emissive subpixel matrix of each consecutive subframe shown in FIGS. 6-11, respectively, so as to produce a single multiplexed image that includes elements A . . . P, as viewable by a user. The 4×4 elements A . . . P (or the 3×3 elements A . . . I, as shown in FIG. 11) are to be placed onto a 5×5 grid representing an emissive subpixel array with one or more sub-standard subpixels present. In some examples, one or two subpixel relative offsets between each of four 5×5 matrices present in each of FIGS. 6-11 may permit compensation for sub-standard subpixels. While matrices of 5×5 elements are presented in FIGS. 6-11 for purposes of illustration, these matrices may represent only portions of much larger arrays that include, for example, hundreds or thousands of rows and columns, with emissive elements used to generate each of the viewable subpixels in the resulting multiplexed image being offset by one, two, three, or more element locations (e.g., rows and/or columns) between consecutive subframes, in accordance with the principles and techniques described herein.

Figure 6:
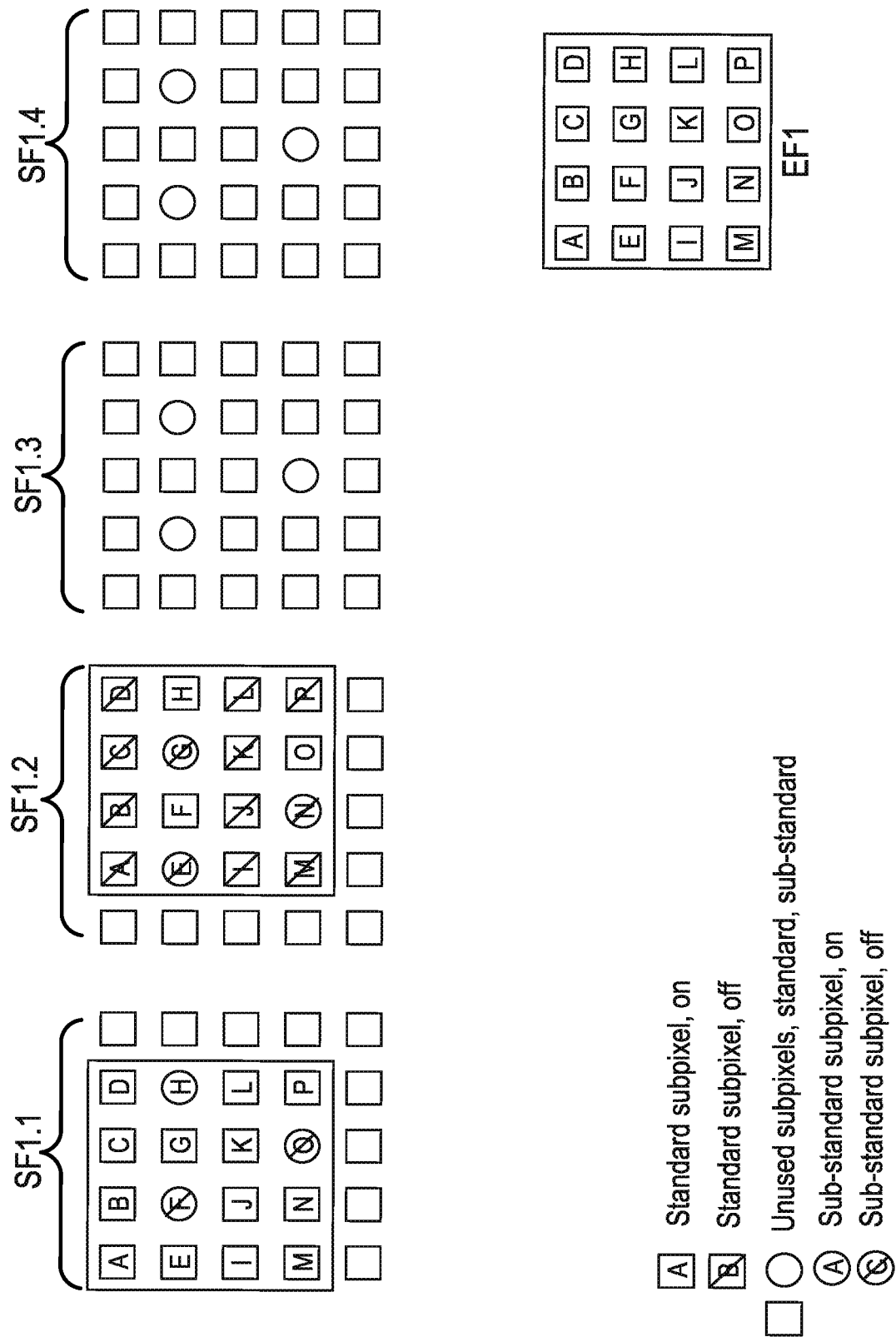
FIG. 6 is a view of an example set of subframes that may provide sub-standard subpixel compensation, in accordance with some embodiments.

In one embodiment, as shown in FIG. 6, four subframes SF1.1-SF1.4 are shown. In this example, two subframes may be used, namely subframes SF1.1-SF1.2. The emissive subpixel array illustrated in FIG. 6 has two dead or disabled subpixels (i.e., elements labelled by elements F and O indicate dead subpixels in subframe SF1.1) and one partially deficient subpixel (i.e., element labelled letter H in subframe SF1.1). The desired converted input data are sent in full to subframe SF1.1. Subframe SF1.2 is generated for sub-standard subpixel compensation based on the sub-standard locations in subframe SF1.1, which are associated with elements F, H, and O. With elements F and O now shifted to standard subpixels, there is compensation for these dead subpixels. In addition, the one partially lit subpixel (i.e., element H now in subframe SF1.2) receives compensation. In this example, the set of subpixels enclosed in the rectilinear outline in subframe SF1.1 is displaced one subpixel to the right to form subframe SF1.2. Subframes SF1.3 and SF1.4 do not contribute anything, in this example. Accordingly, all elements A . . . P in the subframes SF1.1 and SF1.2 have been associated with standard subpixels, with appropriate relative shifts between the subframes using, for example, a light deviator (e.g., LLSO 345 illustrated in FIG. 3). The resultant image of effective frame EF1 in FIG. 6 is achieved by temporally multiplexing the subframes SF1.1-SF1.2 to the viewer.

Figure 7:
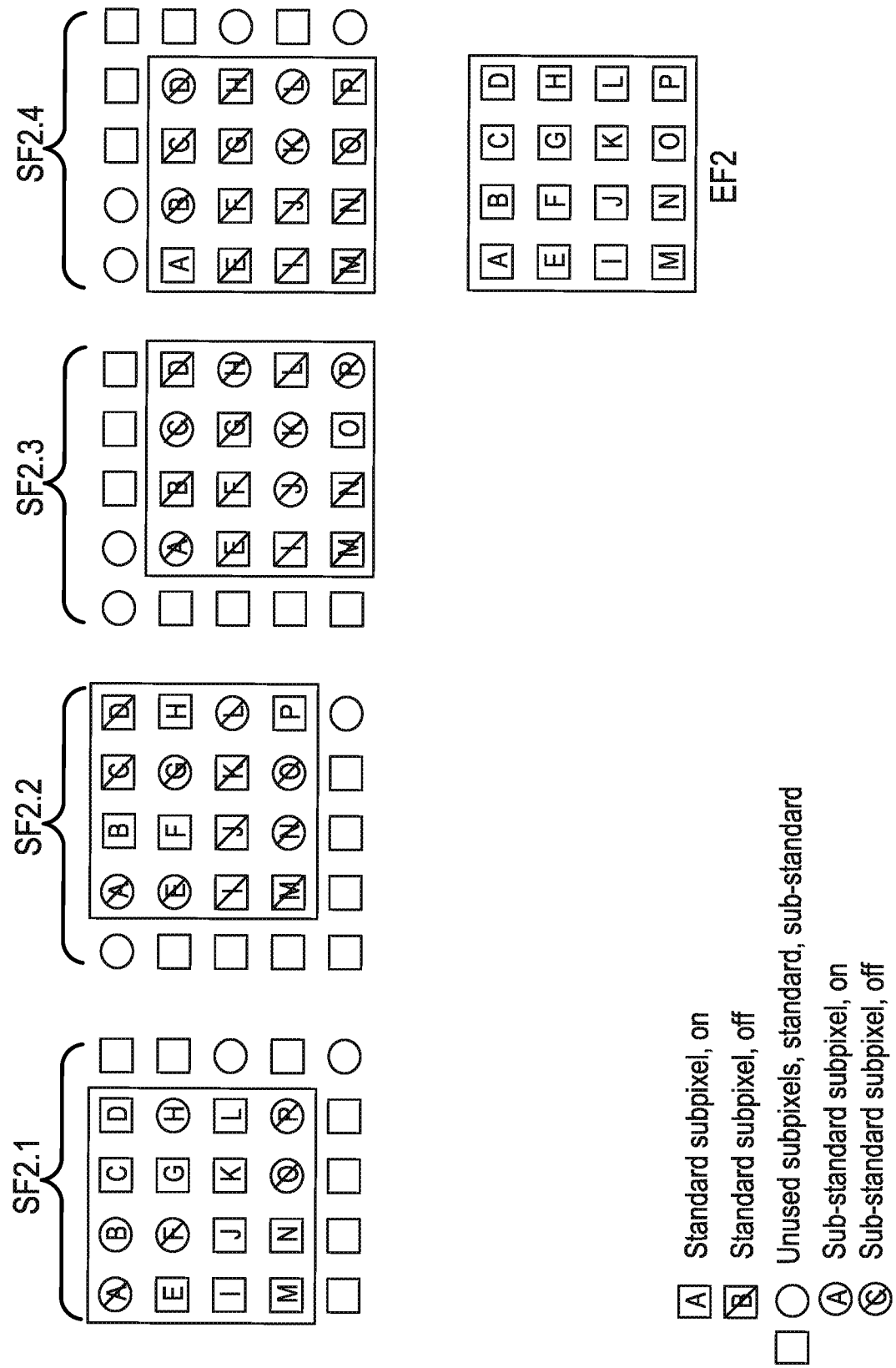
FIG. 7 is a view of an example set of subframes that may provide sub-standard subpixel compensation, in accordance with some embodiments.

FIG. 7 is an example, in which there are four subframes (i.e., subframes SF2.1-SF2.4), and all of these subframes are used in combination to generate the temporally multiplexed image as perceived by the viewer. The emissive array of subpixels shown in FIG. 7 has many sub-standard subpixels, such as A, B, F, H, O, and P, as seen in subframe SF2.1. The subframe SF2.1 has been generated, for example, with only the full received image data and may provide no sub-standard subpixel compensation for other frames. Subframe SF2.2 is generated to provide compensation just for the sub-standard subpixels in subframe SF2.1, which requires a relative shift of the elements of subframe SF2.1 of one subpixel to the right. In this shift, for example, each of elements B, F, H, and P, as shown in subframe SF2.2, are now placed one subpixel to the right from their previous positions and are now each associated with a standard subpixel. Accordingly, subpixels selectively illuminated in subframe SF2.2 may compensate for part of sub-standard subpixels B and H (which are each shown in the "on" state indicating that subpixels B and H are emitting some amount of light that is below spec in subframe SF2.1) and may compensate for all of sub-standard subpixels F and P (which are each shown in the "off" state indicating that subpixels F and P are emitting little or no light in subframe SF2.1).

However, subframe SF2.2 may not be able to fully compensate for all of the sub-standard subpixels found in subframe SF2.1. Thus, additional subframes may be required to cover more fully the compensation of sub-standard subpixels. Subframe SF2.3 allows element O to be placed and associated with a standard subpixel as there is a relative shift of one subpixel down with respect to subframe SF2.2. However, element A cannot be accommodated in subframe SF2.3 as it would be over a sub-standard subpixel. Thus, to accommodate the last unassigned element A, subframe SF2.4 is shifted to the left by one subpixel relative to subframe SF2.3 and thus element A can be displayed using a standard subpixel in subframe SF2.4. Temporal multiplexing of subframes SF2.1-SF2.4 yields an effective resultant image of effective frame EF2, as viewed by the viewer. All elements A . . . P have thus been associated with standard subpixels in the four subframes SF2.1-SF2.4 such that all substandard subpixels have thus been addressed and compensated for in resultant image of effective frame EF2.

Figure 8:
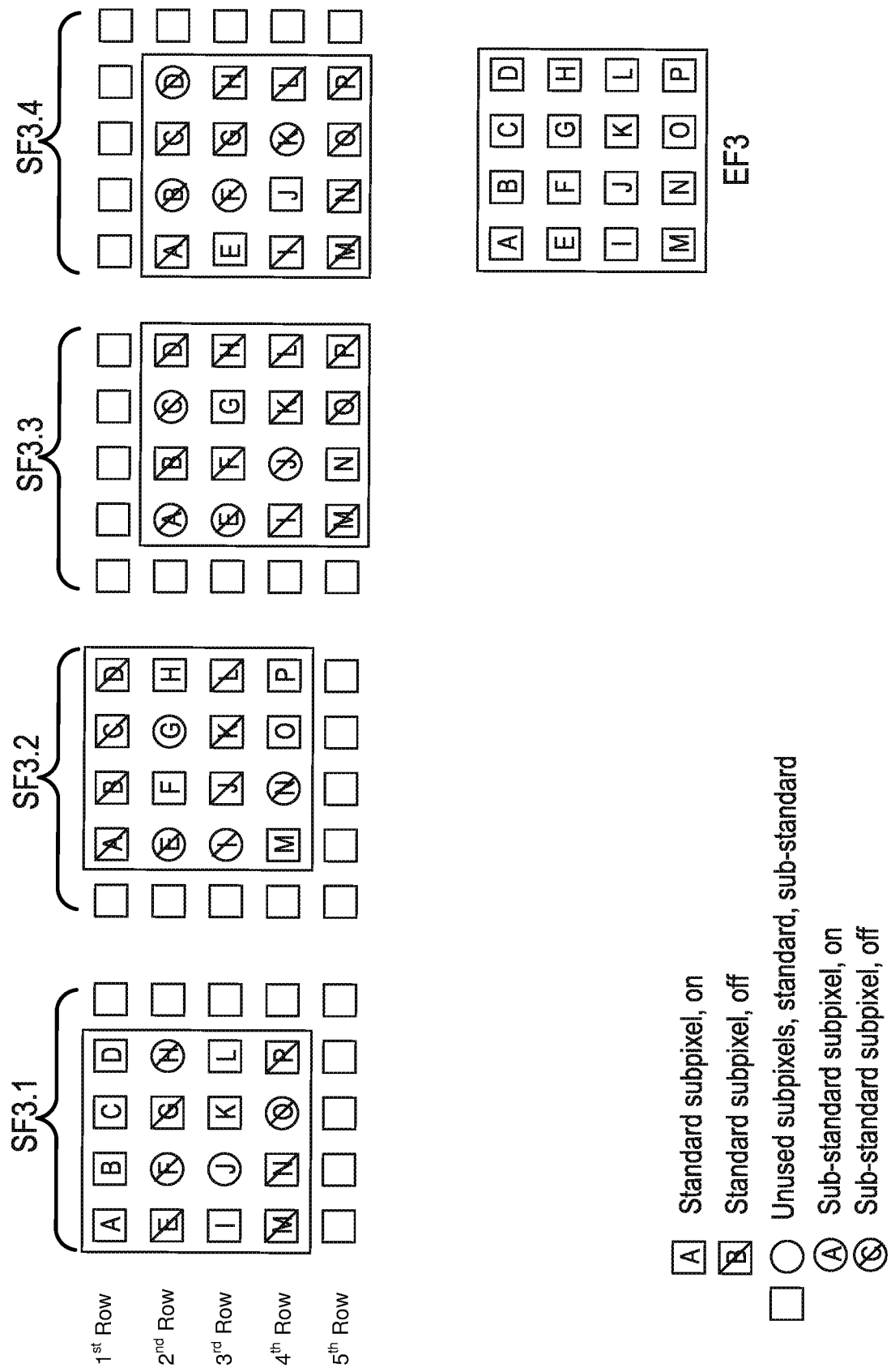
FIG. 8 is a view of an example set of subframes that may provide sub-standard subpixel compensation, in accordance with some embodiments.

FIG. 8 is an example in which one half of the elements A . . . P are used in subframe SF3.1 (i.e., the first and third rows) and the other half are used in subframe SF3.2 (i.e., the second and fourth rows). Sub-standard subpixel compensation occurs in subframes SF3.3 and SF3.4. The active sub-standard subpixel in subframe SF3.1 is J. By shifting down one subpixel from that shown in subframe SF3.1, as in subframe SF3.4, the element J is now placed onto a standard subpixel. The active sub-standard subpixel in subframe SF3.2 is G and the inactive sub-standard subpixels in subframe SF3.2 are E and N. By shifting down one element in subframe SF3.2, as in subframe SF3.3, each of the elements G and N is now associated with a standard subpixel. Further, since sub-standard element E in subframe SF3.2 may not be compensated for in subframe SF3.3 due to a sub-standard subpixel at the position corresponding to element E in the third row of subframe SF3.3, element E may be compensated for by shifting down one element and to the left by one element, as in subframe SF3.4, so that element E is now associated with a standard subpixel. The resultant image of effective frame EF3, as perceived by a viewer, is achieved by temporally multiplexing subframes SF3.1-SF3.4. All input data, and all substandard subpixels have thus been addressed and compensated for in the resultant image of effective frame EF3, as viewed by the viewer, with relative shifts from standard subpixels.

Figure 9:
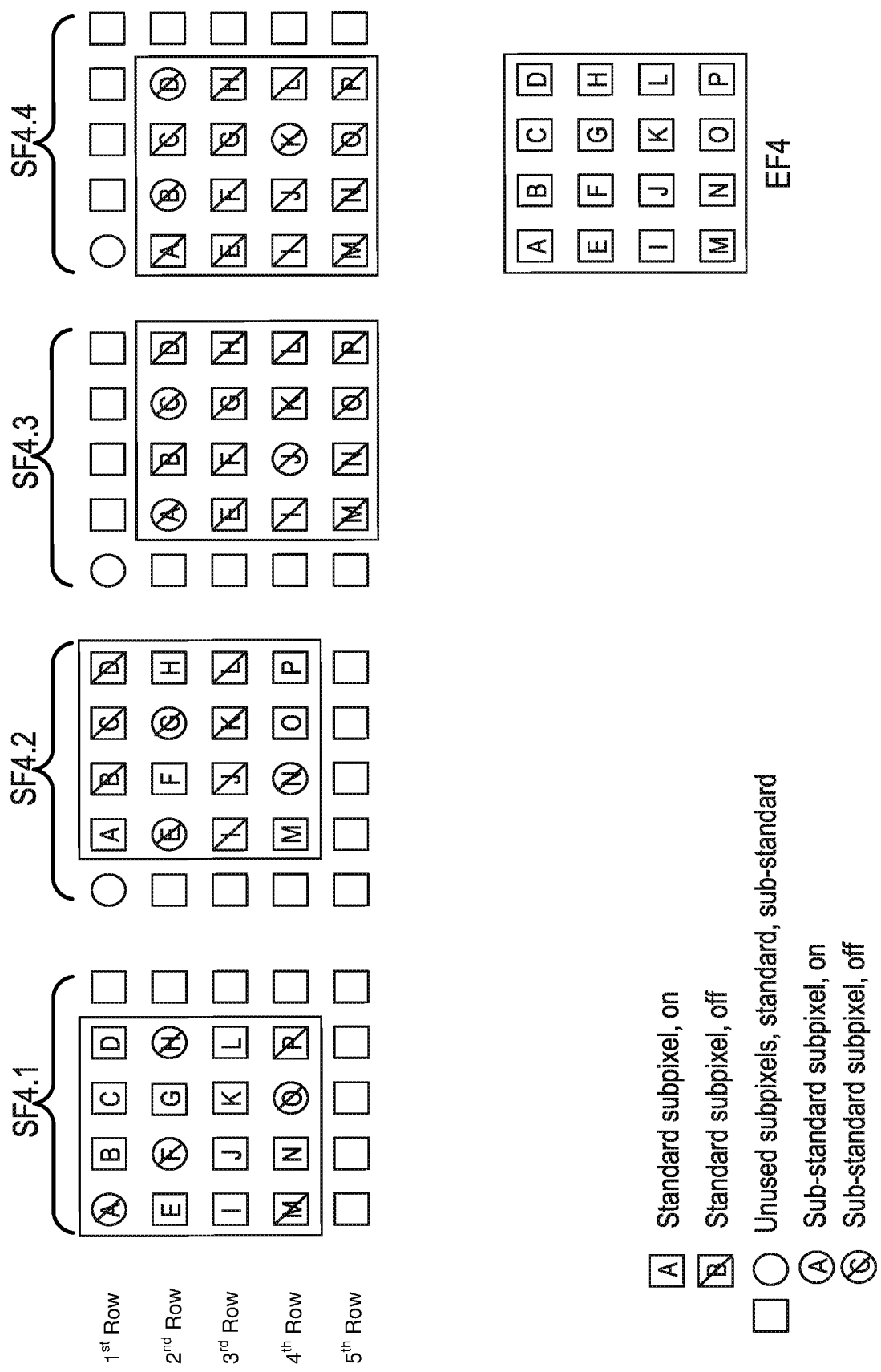
FIG. 9 is a view of an example set of subframes that may provide sub-standard subpixel compensation, in accordance with some embodiments.

FIG. 9 is an example, in which subframe SF4.1 includes or represents half of the input data (i.e., the first and third rows). Additionally, subframe SF4.1 includes all or a portion of the sub-standard compensation for subframe SF4.2. Subframe SF4.2 represents the other half of the input data (i.e., the second and fourth rows), and all or a portion of the sub-standard compensation for subframe SF4.1. Subframes SF4.3 and SF4.4 are available for additional sub-standard subpixel compensation for the portions not included in either subframe SF4.1 or subframe SF4.2. In this example, they are not needed (although they are available in the event one or more additional subpixels subsequently become sub-standard), and thus the emissive subpixels are all shown in an "off" state in subframes SF4.3 and SF4.4. Subframe SF4.1 compensates for sub-standard subpixels corresponding to elements E, G, and N in subframe SF4.2. Similarly, subframe SF4.2 compensates for a sub-standard subpixel corresponding to element A in subframe SF4.1. The resultant image of effective frame EF4, as viewed by the viewer, is achieved upon temporal multiplexing of subframes SF4.1-SF4.4. All input data, and all substandard subpixels have thus been addressed and compensated for with shifts onto standard subpixels in the resultant image of effective frame EF4.

FIG. 10 again exemplifies a situation with four subframes SF5.1-SF5.4 in which subsets of the elements A . . . P are included in each of the four subframes. According to at least one embodiment, one-quarter of the desired subpixel data plus compensating information may be sent to each of the four sub-frames, with, for example, sub-frames SF5.1 and SF5.2 compensating for each other and sub-frames SF5.3 and SF5.4 compensating for each other. In this example, the desired subpixel data for each of the subframes may include a first quarter of the image data (i.e., elements A, C, I, K) for subframe SF5.1, a second quarter of the image data (i.e., elements E, G, M, O) for subframe SF5.2, a third quarter of the image data (i.e., elements B, D, J, L) for subframe SF5.3, and a fourth quarter of the image data (i.e., elements F, H, N, P) for subframe SF5.4.

Figure 10:
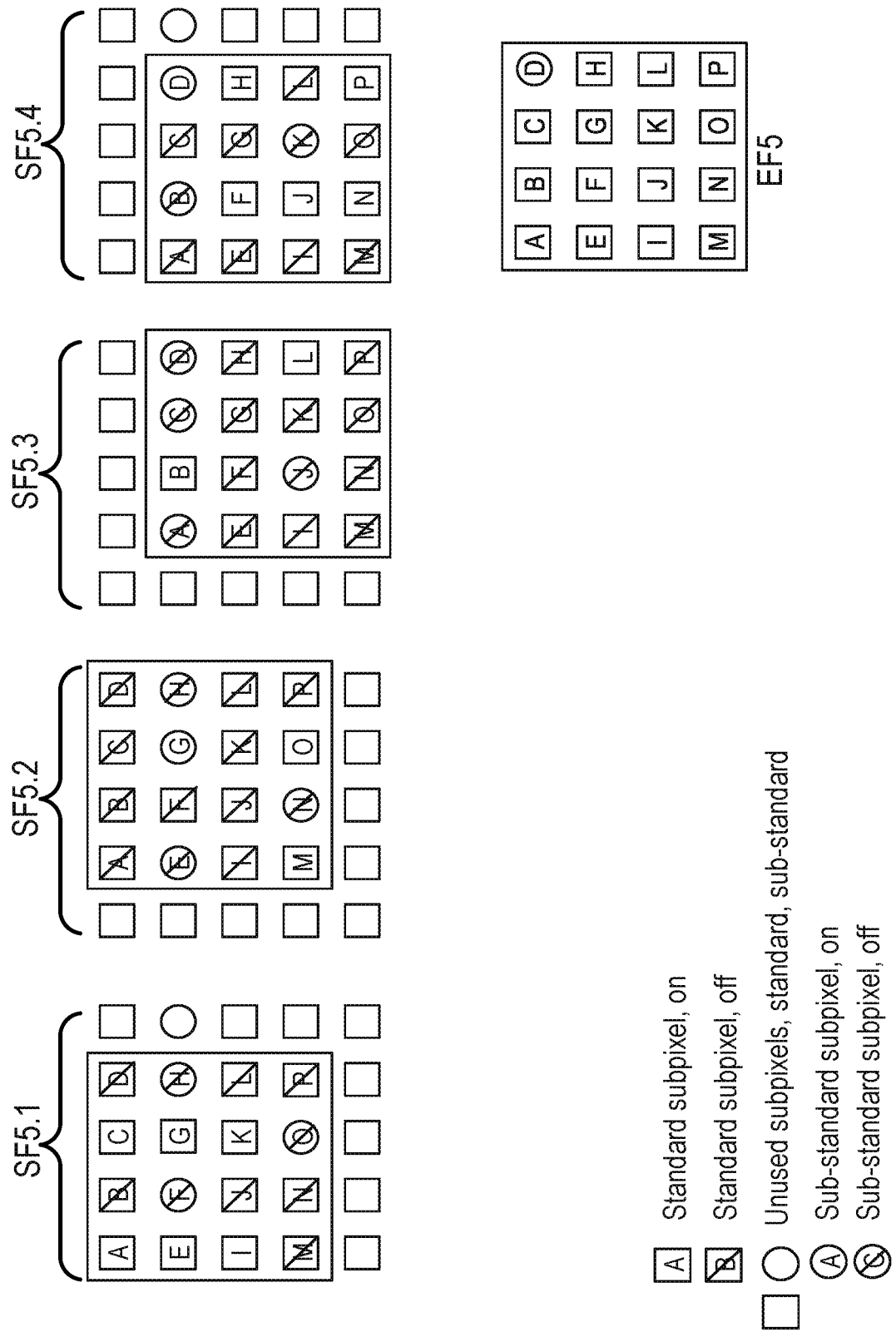
FIG. 10 is a view of an example set of subframes that may provide sub-standard subpixel compensation, in accordance with some embodiments.
Figure 11:
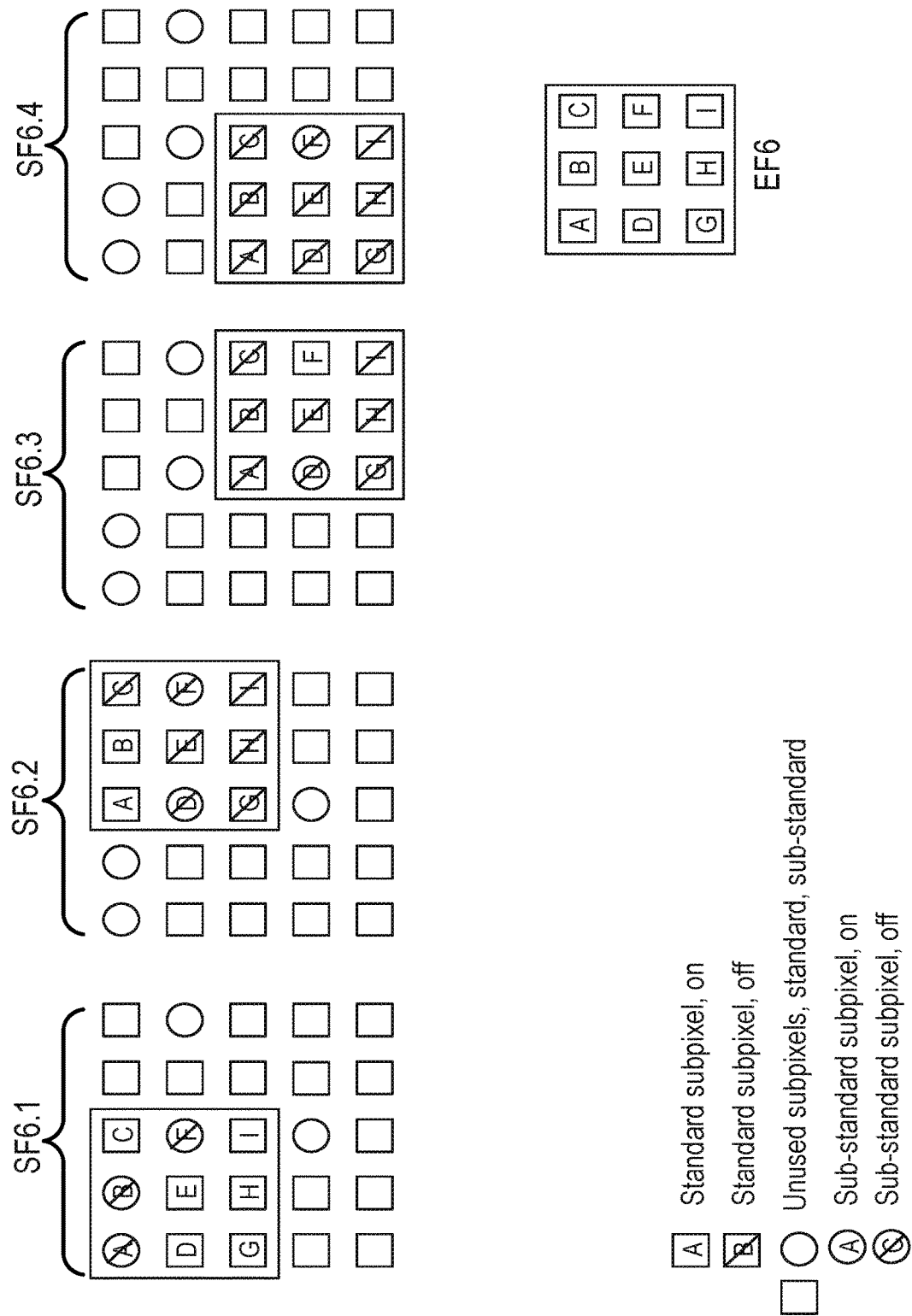
FIG. 11 is a view of an example set of subframes that may provide sub-standard subpixel compensation, in accordance with some embodiments.

As shown in FIG. 10, a first quarter of the desired elements (i.e., elements A, C, I, K) are associated with standard subpixels in subframe SF5.1. Additionally, standard subpixels in subframe SF5.1 associated with elements E and G are used to compensate for these elements, which are associated with sub-standard subpixels in subframe SF5.2. Subframe SF5.2, which is shifted one subpixel to the right of subframe SF5.1, provides standard subpixel coverage for desired elements M and O. In subframe SF5.3, desired elements B and L are associated with standard subpixels, while elements D and J are associated with sub-standard subpixels and thus require compensation in subsequent subframe SF5.4. In subframe SF5.4, a fourth quarter of the desired elements (i.e., elements F, H, N, P) are associated with standard subpixels. Additionally, in subframe SF5.4, a standard subpixel associated with element J, as well as a sub-standard "on" subpixel (e.g., a partially-illuminated subpixel) associated with element D, are used to compensate for elements D and J, which are associated with sub-standard subpixels in subframe SF5.3. This arrangement avoids any subpixel being used in two consecutive subframes, which may aid in providing a greater number of subframes displayed per unit time in certain array technologies. The resultant image of effective frame EF5, as viewed by the viewer, results from the temporal multiplexing of the subframes SF5.1-SF5.4, in which all elements, except for that of D (which is partially illuminated), have been associated with standard subpixels.

FIG. 11 exemplifies a situation where there is a relative two-subpixel shift between subframes. Such an approach may allow for compensating adjacent sub-standard subpixels. In subframe SF6.1, sub-standard subpixels associated with elements A and B are compensated for in subframe SF6.2 by a two subpixel right shift relative to subframe SF6.1. Subframe SF6.3 compensates only for subpixel F by a two subpixel down shift relative to subframe SF6.2. Subframe SF6.4 provides no compensation nor any input data in this example. After combining these subframes by temporal multiplexing, the resultant image is effective frame EF6, as viewed by the viewer. As the shifts may be larger than one subpixel, this action reduces the effective frame size accordingly as is seen in the resultant image of effective frame EF6, although the effect of this larger shift may be negligible in displays having hundreds or thousands of subpixel rows and columns.

The following will provide a detailed exemplary method for compensating sub-standard subpixels in an array. The steps shown in FIG. 12 may be performed by any suitable computer-executable code and/or computing system, including the exemplary systems illustrated in FIGS. 2, 3, and 13. In one example, one or more of the steps shown in FIG. 12 may represent an algorithm whose structure includes and/or may be represented by multiple sub-steps, examples of which may be provided in greater detail below. The steps in FIG. 12 may be also performed by hardware in the form of circuits, including one or more modules/components/subsystems system 1350 depicted in FIG. 13.

Figure 12:
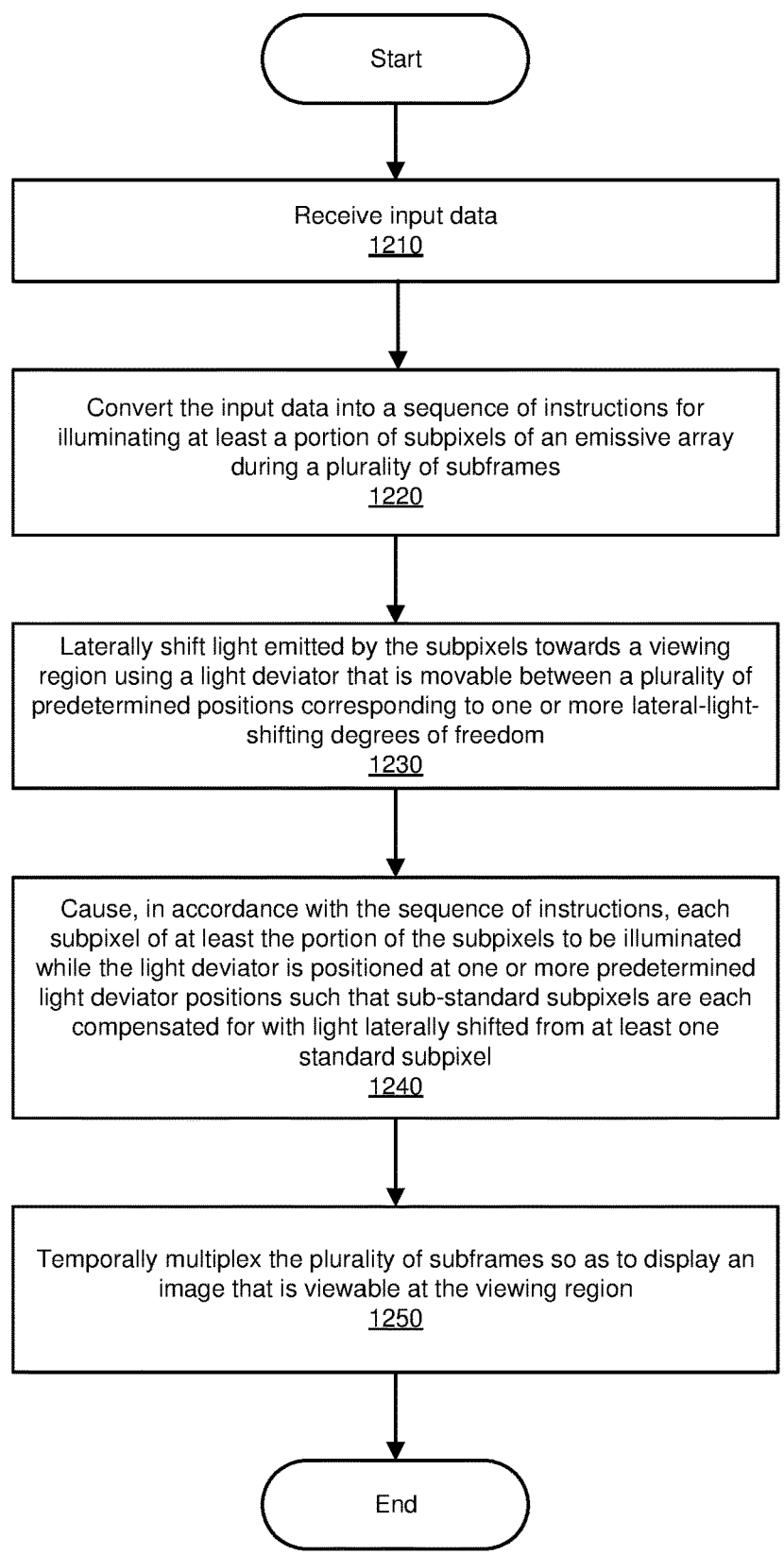
FIG. 12 is a flow diagram of an exemplary method for generating subframes, in accordance with some embodiments.

FIG. 12 is a flow diagram of an exemplary method 1200 for compensating sub-standard subpixels in an array of subpixels of a display device. For example, the method may be utilized to generate a plurality of subframes with compensation for sub-standard subpixels that, when temporally multiplexed to a viewer by an optical system, may permit a viewer to perceive an image.

In at least one embodiment, at step 1210 in FIG. 12, a controller may receive input data. For example, input data, which may include image data for generating an image on the display device, may be received by the controller 320 shown in FIG. 3 and in system 1350 of FIG. 13.

Figure 13:
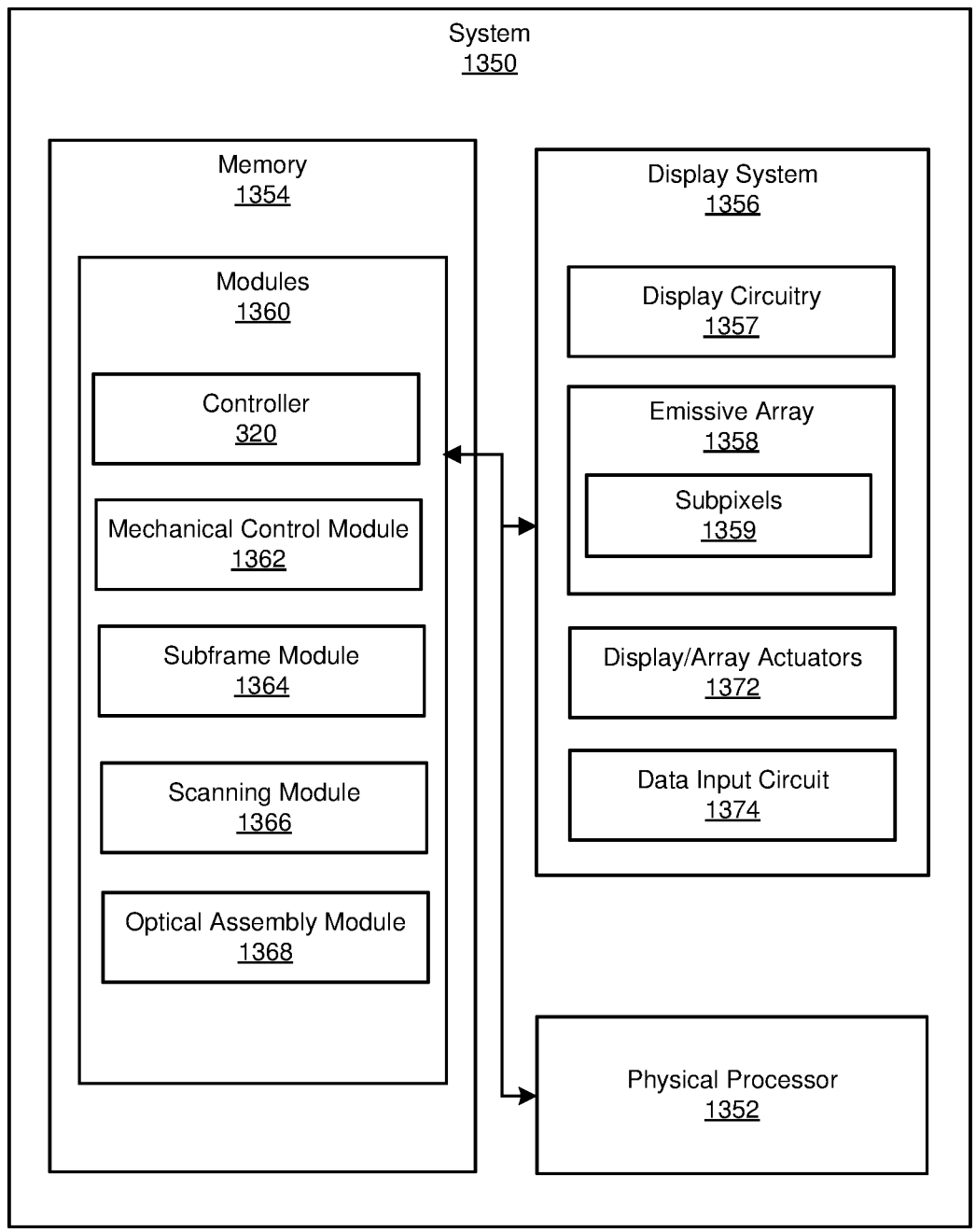
FIG. 13 is a block diagram of an exemplary system suitable for implementing the disclosed generation of subframes, in accordance with some embodiments.

As illustrated in FIG. 13, example system 1350 may include one or more physical processors, such as physical processor 1352. Physical processor 1352 generally represents any type or form of hardware-implemented processing unit capable of interpreting and/or executing computer-readable instructions. Physical processor 1352 may facilitate the actions of the computer-implemented method illustrated in FIG. 12. In one example, physical processor 1352 may access and/or modify one or more of modules 1360 stored in memory 1354 shown in FIG. 13.

Additionally, as illustrated in FIG. 13, exemplary display system 1350 may additionally include one or more modules 1360 for performing one or more tasks as disclosed herein, including actions performed by one or more of a display system 1356 that includes display circuitry 1357, an emissive array 1358 including subpixels 1359, display/array actuators 1372 (e.g., for actuating movement and/or rotation of a light deviator, such as LLSO 345 shown in FIG. 3, or for actuating movement of emissive array 1358), an optical assembly (e.g., optical assembly 310 in FIG. 3), a scanning assembly (e.g., scanning assembly 315 in FIG. 3), and/or one or more controllers 320 (see, e.g., FIG. 3) for various display subsystems. In some examples, modules 1360 may include, for example, controller 320, a mechanical control module 1362 (to control, e.g., motional actions of the light deviator or LLSO, such as rotation, tilt, pivot, and/or light reflection), a subframe module 1364, a scanning module 1366, and an optical assembly module 1368. Subframe computations in the subframe module 1364 may be performed prior to any projection or display activity and may create instructions to other modules to perform their functions and/or actions at designated time intervals in addition to taking image data for an image and processing it into subframe data for a plurality of subframes, which may then be transferred to the display system 1356, perhaps with additional processing prior to energizing the appropriate subpixels 1359 in the emissive array 1358. A multitude of subframes may then be rapidly projected to a viewer such that the viewer comprehends the displayed multiplexed subframes as an image—the image from which the plurality of subframes was derived.

Returning to FIG. 12, at step 1220, the controller may convert the input data into a sequence of instructions for illuminating at least a portion of subpixels of an emissive array during a plurality of subframes. For example, the input data may be converted by the controller 320 into a sequence of instructions. In some embodiments, array system 1356 may be used to facilitate or contribute to the generation of the sequence of instructions. In some examples, the sequence of instructions may include instructions for performing actions or functions of one or more these aforementioned components.

At step 1230 in FIG. 12, light emitted by the subpixels may be laterally shifted towards a viewing region using a light deviator that is movable between a plurality of predetermined positions corresponding to one or more lateral-light-shifting degrees of freedom. According to various embodiments, the optical system may include a light deviator (e.g., LLSO 345 shown in FIG. 3) that is movable between a plurality of positions corresponding to one or more lateral-light-shifting degrees of freedom. The plurality of subpixels may include a set of standard subpixels and a set of sub-standard subpixels, where a subset of the sequence of instructions includes instructions to compensate for at least a portion of the set of sub-standard subpixels with light laterally shifted by the light deviator from one or more standard subpixels of the set of standard subpixels (see, e.g., FIGS. 6-11).

In some embodiments, a first set of subframes of the plurality of subframes may include the converted input data. In this example, the one or more standard subpixels may be illuminated during a second set of subframes of the plurality of subframes to compensate for at least a portion of the set of sub-standard subpixels that are present in the first set of subframes.

According to at least one embodiment, the plurality of subframes may include pairs of subframes, with each pair including a first subframe and a second subframe. In this example, the first subframe of a pair may compensate for at least a portion of the sub-standard subpixels present in the second subframe and the second subframe may compensate for at least a portion of the sub-standard subpixels present in the first subframe. In some examples, the first subframe may include a portion of the converted input data distributed in even-numbered lines of the first subframe and the second subframe may include another portion of the converted input data distributed in odd-numbered lines of the second subframe. Sub-standard subpixel compensation for the first subframe may occur in the even-numbered lines of the second subframe and sub-standard subpixel compensation for the second subframe may occur in the odd-numbered lines of the first subframe.

At step 1240 of FIG. 12, one or more of the systems described herein may cause, in accordance with the sequence of instructions, each subpixel of at least the portion of the subpixels to be illuminated while the light deviator is positioned at one or more predetermined light deviator positions such that sub-standard subpixels are each compensated for with light laterally shifted from at least one standard subpixel. For example, subframe module 1364 may generate a plurality of subframes from the sequence of instructions using at least a portion of the plurality of subpixels of the subpixel array (e.g., emissive subpixels 1359 of emissive array 1358) of the display system 1356 shown in FIG. 13. Some of these subpixels of the display system 1356 may have standard performance characteristics (i.e., in-spec), and others may have sub-standard characteristics (i.e., out-of-spec). To compensate for the sub-standard subpixels used in generating the subframes, light from one or more subpixels of the set of standard subpixels may be laterally shifted by a light deviator (e.g., LLSO 345 shown in FIG. 3), or the subpixels may be shifted (e.g., by shifting emissive array 1358 using one or more display/array actuators 1372), to a location that may compensate for the diminished capacity of at least one sub-standard subpixel. The light from one or more standard subpixels may thus contribute to a sub-standard subpixel during one or more of the subframes. The compensation for sub-standard subpixels may be present in subframes which contain portions of the image derived from the input data, or the converted input data, or may be present in subframes that contain no input data.

At step 1250 of FIG. 12, one or more of the systems described herein may temporally multiplex the plurality of subframes so as to display an image that is viewable at the viewing region. For example, the display system 1356 of FIG. 13 may temporally multiplex the one or more subframes generated by subframe module 1364 to form an image as perceived by the viewer (i.e., an image that is formed by a plurality of subpixels displayed at virtual subpixel locations in the viewing region).

In some examples, subframe module 1364 of system 1350 in FIG. 13 may perform subframe computations prior to any projection or display activity and create instructions to other modules to perform their functions and/or actions at the designated time. With a multitude of generated subframes rapidly projected to a viewer, the impression derived by the viewer may be one possessing depth perception and/or action. The plurality of subframes generated by the subsystem of subframe computation module 1364, may contain all or portions of the input data and/or converted input data to be sent to emissive array 1358. The plurality of subframes may also contain compensation for any sub-standard subpixel that may have contributed to the formatting of any portion of the image or input data. Alternatively, a first subframe may contain only image data, and a second subframe may contain only compensation data to compensate for sub-standard subpixels used in the first subframe.

The described subpixel array devices, subpixel arrangements, and methods may allow for spatial, linear temporal, circular temporal, and/or any other suitable temporal subpixel averaging, enabling an increased range of colors to be displayed without sacrificing resolution or increasing the subpixel array area. Additionally, the disclosed devices, systems, and methods may enable compensation for sub-standard subpixels by shifting light from other subpixels in an array during selected subframes such that the impact of such sub-standard subpixels is minimized or eliminated from a viewer's perspective.

Embodiments of the instant disclosure may include or be implemented in conjunction with various types of artificial reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs), an example of which is augmented-reality system 1400 in FIG. 14. Other artificial reality systems may include an NED that also provides visibility into the real world (e.g., augmented-reality system 1500 in FIG. 15) or that visually immerses a user in an artificial reality (e.g., virtual-reality system 1600 in FIG. 16). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Figure 14:
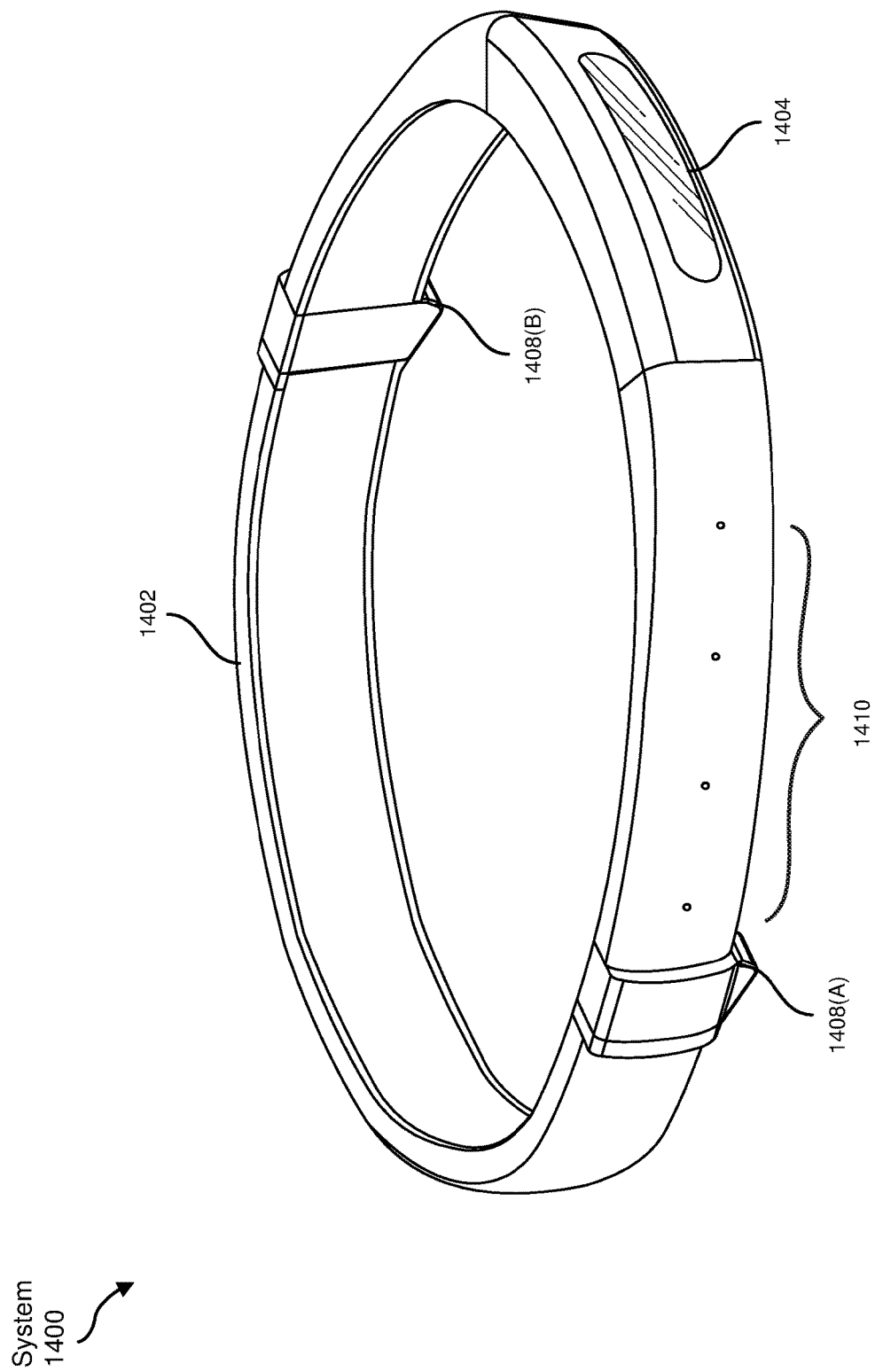
FIG. 14 is a perspective view of an exemplary augmented reality device into which the systems and apparatuses described herein may be incorporated, in accordance with some embodiments.

Turning to FIG. 14, augmented-reality system 1400 generally represents a wearable device dimensioned to fit about a body part (e.g., a head) of a user. As shown in FIG. 14, system 1400 may include a frame 1402 and a camera assembly 1404 that is coupled to frame 1402 and configured to gather information about a local environment by observing the local environment. Augmented-reality system 1400 may also include one or more audio devices, such as output audio transducers 1408(A) and 1408(B) and input audio transducers 1410. Output audio transducers 1408(A) and 1408(B) may provide audio feedback and/or content to a user, and input audio transducers 1410 may capture audio in a user's environment.

As shown, augmented-reality system 1400 may not necessarily include an NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 1400 may not include an NED, augmented-reality system 1400 may include other types of screens or visual feedback devices (e.g., a display screen integrated into a side of frame 1402).

Figure 15:
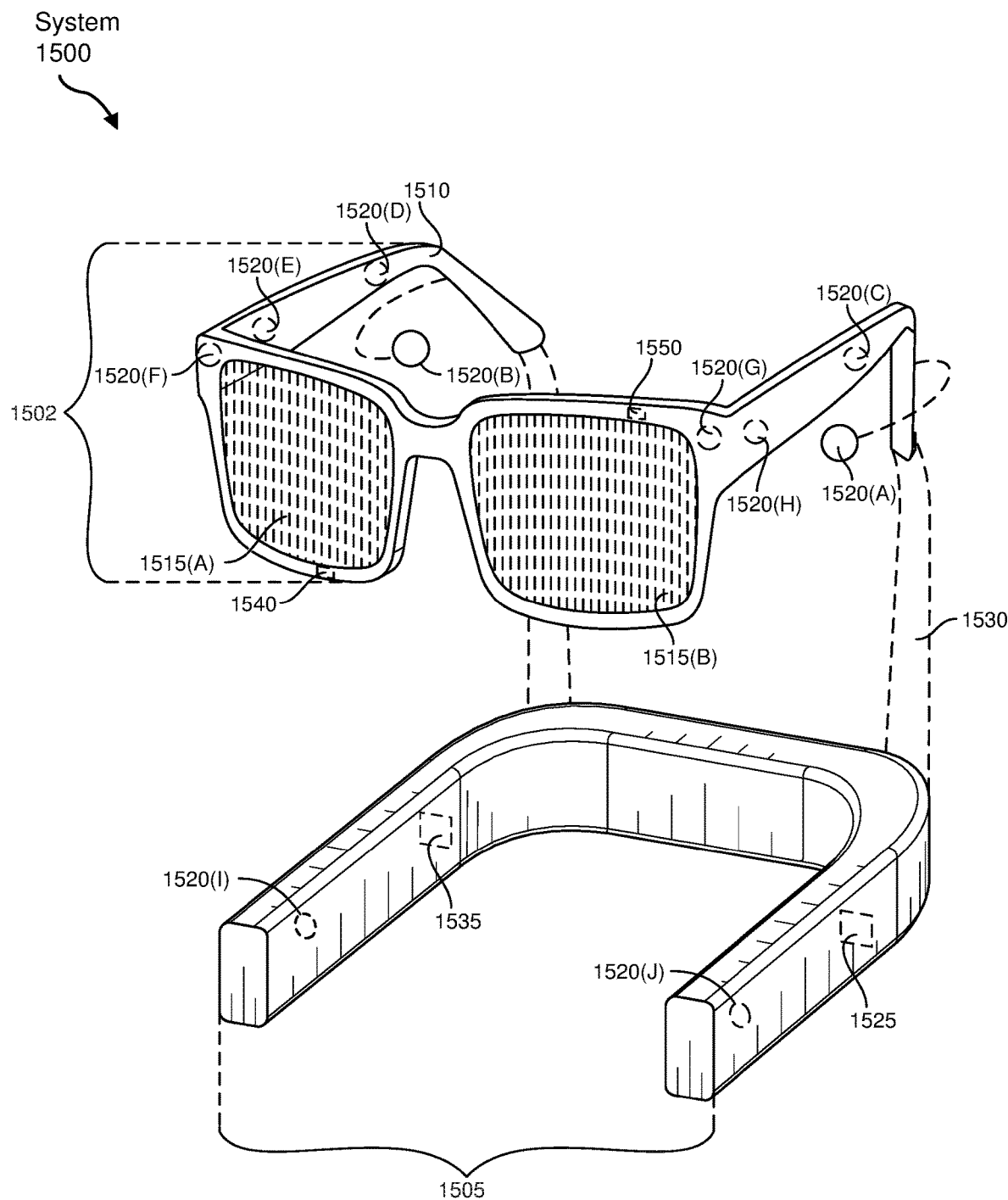
FIG. 15 is a perspective view of an exemplary augmented reality device into which the systems and apparatuses described herein may be incorporated, in accordance with some embodiments.

The embodiments discussed in this disclosure may also be implemented in augmented-reality systems that include one or more NEDs. For example, as shown in FIG. 15, augmented-reality system 1500 may include an eyewear device 1502 with a frame 1510 configured to hold a left display device 1515(A) and a right display device 1515(B) in front of a user's eyes. Display devices 1515(A) and 1515(B) may act together or independently to present an image or series of images to a user. While augmented-reality system 1500 includes two displays, embodiments of this disclosure may be implemented in augmented-reality systems with a single NED or more than two NEDs.

In some embodiments, augmented-reality system 1500 may include one or more sensors, such as sensor 1540. Sensor 1540 may generate measurement signals in response to motion of augmented-reality system 1500 and may be located on substantially any portion of frame 1510. Sensor 1540 may include a position sensor, an inertial measurement unit (IMU), a depth camera assembly, or any combination thereof. In some embodiments, augmented-reality system 1500 may or may not include sensor 1540 or may include more than one sensor. In embodiments in which sensor 1540 includes an IMU, the IMU may generate calibration data based on measurement signals from sensor 1540. Examples of sensor 1540 may include, without limitation, accelerometers, gyroscopes, magnetometers, other suitable types of sensors that detect motion, sensors used for error correction of the IMU, or some combination thereof.

AR system 1500 may also include a microphone array with a plurality of acoustic sensors 1520(A)-1520(J), referred to collectively as acoustic sensors 1520. Acoustic sensors 1520 may be transducers that detect air pressure variations induced by sound waves. Each acoustic sensor 1520 may be configured to detect sound and convert the detected sound into an electronic format (e.g., an analog or digital format). The microphone array in FIG. 15 may include, for example, ten acoustic sensors: 1520(A) and 1520(B), which may be designed to be placed inside a corresponding ear of the user, acoustic sensors 1520(C), 1520(D), 1520(E), 1520(F), 1520(G), and 1520(H), which may be positioned at various locations on frame 1510, and/or acoustic sensors 1520(I) and 1520(J), which may be positioned on a corresponding neckband 1505.

The configuration of acoustic sensors 1520 of the microphone array may vary. While augmented-reality system 1500 is shown in FIG. 15 as having ten acoustic sensors 1520, the number of acoustic sensors 1520 may be greater or less than ten. In some embodiments, using higher numbers of acoustic sensors 1520 may increase the amount of audio information collected and/or the sensitivity and accuracy of the audio information. In contrast, using a lower number of acoustic sensors 1520 may decrease the computing power required by the controller 1550 to process the collected audio information. In addition, the position of each acoustic sensor 1520 of the microphone array may vary. For example, the position of an acoustic sensor 1520 may include a defined position on the user, a defined coordinate on the frame 1510, an orientation associated with each acoustic sensor, or some combination thereof.

Acoustic sensors 1520(A) and 1520(B) may be positioned on different parts of the user's ear, such as behind the pinna or within the auricle or fossa. Or, there may be additional acoustic sensors on or surrounding the ear in addition to acoustic sensors 1520 inside the ear canal. Having an acoustic sensor positioned next to an ear canal of a user may enable the microphone array to collect information on how sounds arrive at the ear canal. By positioning at least two of acoustic sensors 1520 on either side of a user's head (e.g., as binaural microphones), augmented-reality device 1500 may simulate binaural hearing and capture a 3D stereo sound field around about a user's head. In some embodiments, acoustic sensors 1520(A) and 1520(B) may be connected to augmented-reality system 1500 via a wired connection, and in other embodiments, the acoustic sensors 1520(A) and 1520(B) may be connected to augmented-reality system 1500 via a wireless connection (e.g., a Bluetooth connection). In still other embodiments, acoustic sensors 1520(A) and 1520(B) may not be used at all in conjunction with augmented-reality system 1500.

Acoustic sensors 1520 on frame 1510 may be positioned along the length of the temples, across the bridge, above or below display devices 1515(A) and 1515(B), or some combination thereof. Acoustic sensors 1520 may be oriented such that the microphone array is able to detect sounds in a wide range of directions surrounding the user wearing the augmented-reality system 1500. In some embodiments, an optimization process may be performed during manufacturing of augmented-reality system 1500 to determine relative positioning of each acoustic sensor 1520 in the microphone array.

AR system 1500 may further include or be connected to an external device (e.g., a paired device), such as neckband 1505. As shown, neckband 1505 may be coupled to eyewear device 1502 via one or more connectors 1530. Connectors 1530 may be wired or wireless connectors and may include electrical and/or non-electrical (e.g., structural) components. In some cases, eyewear device 1502 and neckband 1505 may operate independently without any wired or wireless connection between them. While FIG. 15 illustrates the components of eyewear device 1502 and neckband 1505 in example locations on eyewear device 1502 and neckband 1505, the components may be located elsewhere and/or distributed differently on eyewear device 1502 and/or neckband 1505. In some embodiments, the components of eyewear device 1502 and neckband 1505 may be located on one or more additional peripheral devices paired with eyewear device 1502, neckband 1505, or some combination thereof. Furthermore, neckband 1505 generally represents any type or form of paired device. Thus, the following discussion of neckband 1505 may also apply to various other paired devices, such as smart watches, smart phones, wrist bands, other wearable devices, hand-held controllers, tablet computers, laptop computers, etc.

Pairing external devices, such as neckband 1505, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1500 may be provided by a paired device or shared between a paired device and an eyewear device, thus reducing the weight, heat profile, and form factor of the eyewear device overall while still retaining desired functionality. For example, neckband 1505 may allow components that would otherwise be included on an eyewear device to be included in neckband 1505 since users may tolerate a heavier weight load on their shoulders than they would tolerate on their heads. Neckband 1505 may also have a larger surface area over which to diffuse and disperse heat to the ambient environment. Thus, neckband 1505 may allow for greater battery and computation capacity than might otherwise have been possible on a stand-alone eyewear device. Since weight carried in neckband 1505 may be less invasive to a user than weight carried in eyewear device 1502, a user may tolerate wearing a lighter eyewear device and carrying or wearing the paired device for greater lengths of time than a user would tolerate wearing a heavy stand-alone eyewear device, thereby enabling an artificial reality environment to be incorporated more fully into a user's day-to-day activities.

Neckband 1505 may be communicatively coupled with eyewear device 1502 and/or to other devices. The other devices may provide certain functions (e.g., tracking, localizing, depth mapping, processing, storage, etc.) to augmented-reality system 1500. In the embodiment of FIG. 15, neckband 1505 may include two acoustic sensors (e.g., 1520(1) and 1520(J)) that are part of the microphone array (or potentially form their own microphone subarray). Neckband 1505 may also include a controller 1525 and a power source 1535.

Acoustic sensors 1520(1) and 1520(J) of neckband 1505 may be configured to detect sound and convert the detected sound into an electronic format (analog or digital). In the embodiment of FIG. 15, acoustic sensors 1520(1) and 1520 (J) may be positioned on neckband 1505, thereby increasing the distance between the neckband acoustic sensors 1520(1) and 1520(J) and other acoustic sensors 1520 positioned on eyewear device 1502. In some cases, increasing the distance between acoustic sensors 1520 of the microphone array may improve the accuracy of beamforming performed via the microphone array. For example, if a sound is detected by acoustic sensors 1520(C) and 1520(D) and the distance between acoustic sensors 1520(C) and 1520(D) is greater than, e.g., the distance between acoustic sensors 1520(D) and 1520(E), the determined source location of the detected sound may be more accurate than if the sound had been detected by acoustic sensors 1520(D) and 1520(E).

Controller 1525 of neckband 1505 may process information generated by the sensors on neckband 1505 and/or augmented-reality system 1500. For example, controller 1525 may process information from the microphone array that describes sounds detected by the microphone array. For each detected sound, controller 1525 may perform a DoA estimation to estimate a direction from which the detected sound arrived at the microphone array. As the microphone array detects sounds, controller 1525 may populate an audio data set with the information. In embodiments in which augmented-reality system 1500 includes an inertial measurement unit, controller 1525 may compute all inertial and spatial calculations from the IMU located on eyewear device 1502. Connector 1530 may convey information between augmented-reality system 1500 and neckband 1505 and between augmented-reality system 1500 and controller 1525. The information may be in the form of optical data, electrical data, wireless data, or any other transmittable data form. Moving the processing of information generated by augmented-reality system 1500 to neckband 1505 may reduce weight and heat in eyewear device 1502, making it more comfortable to the user.

Power source 1535 in neckband 1505 may provide power to eyewear device 1502 and/or to neckband 1505. Power source 1535 may include, without limitation, lithium ion batteries, lithium-polymer batteries, primary lithium batteries, alkaline batteries, or any other form of power storage. In some cases, power source 1535 may be a wired power source. Including power source 1535 on neckband 1505 instead of on eyewear device 1502 may help better distribute the weight and heat generated by power source 1535.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 1600 in FIG. 16, that mostly or completely covers a user's field of view. Virtual-reality system 1600 may include a front rigid body 1602 and a band 1604 shaped to fit around a user's head. Virtual-reality system 1600 may also include output audio transducers 1606(A) and 1606(B). Furthermore, while not shown in FIG. 16, front rigid body 1602 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in augmented-reality system 1500 and/or virtual-reality system 1600 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in augmented-reality system 1500 and/or virtual-reality system 1600 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, augmented-reality system 1400, augmented-reality system 1500, and/or virtual-reality system 1600 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 14 and 16, output audio transducers 1408(A), 1408(B), 1606(A), and 1606(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 1410 may include condenser microphones, dynamic microphones, ribbon microphones, and/or any other type or form of input transducer. In some embodiments, a single transducer may be used for both audio input and audio output.

Figure 16:
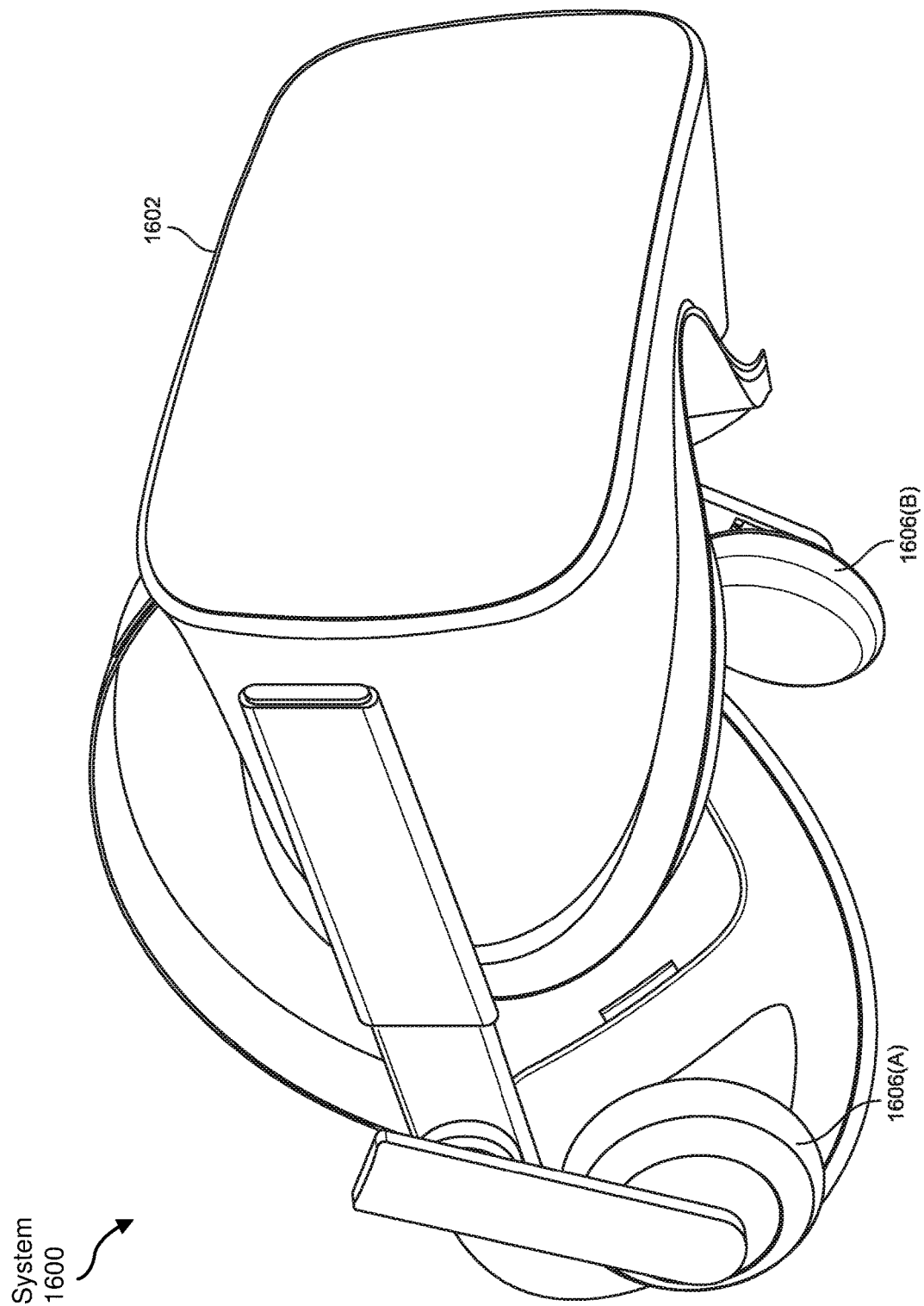
FIG. 16 is a perspective view of an exemplary virtual reality device into which the systems and apparatuses described herein may be incorporated, in accordance with some embodiments.

While not shown in FIGS. 14-16, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices may include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors may include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

In some embodiments, the term "computer-readable medium" generally refers to any form of device, carrier, or medium capable of storing or carrying computer-readable instructions. Examples of computer-readable media may include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein may be given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or may include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations may be possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system to compensate for sub-standard subpixels in a display device, the system comprising:
   an optical system that laterally shifts light emitted by subpixels of an emissive array towards a viewing region using a light deviator that is movable between a plurality of predetermined positions corresponding to one or more lateral-light-shifting degrees of freedom; and
   a controller that:
      converts input data into a sequence of instructions for illuminating at least a portion of the subpixels during a plurality of subframes, the sequence of instructions causing each subpixel of at least the portion of the subpixels to be illuminated for a predetermined illumination time while the light deviator is positioned at one or more predetermined light deviator positions such that sub-standard subpixels are each compensated for with light laterally shifted from at least one standard subpixel; and
      temporally multiplexes the plurality of subframes so as to display an image that is viewable at the viewing region, wherein:
   the plurality of subframes comprises pairs of subframes, with each pair comprising a first subframe and a second subframe;
   the first subframe of a pair compensates for at least a portion of the sub-standard subpixels present in the second subframe and the second subframe compensates for at least a portion of the sub-standard subpixels present in the first subframe;
   the first subframe comprises a portion of the converted input data distributed in even-numbered lines of the first subframe;
   the second subframe comprises another portion of the converted input data distributed in odd-numbered lines of the second subframe; and
   sub-standard subpixel compensation for the first subframe occurs in the even-numbered lines of the second subframe and sub-standard subpixel compensation for the second subframe occurs in the odd-numbered lines of the first subframe.

2. The system of claim 1, wherein:
   a first set of subframes of the plurality of subframes comprises the converted input data; and
   one or more standard subpixels are illuminated during a second set of subframes of the plurality of subframes to compensate for sub-standard subpixels that are present in the first set of subframes.

3. The system of claim 1, wherein the plurality of subframes are generated by the following representation:

$$SF_j = \Sigma_i^{N_j} f(q_{ij}),$$

where $SF_j$ is a j-th subframe, comprising a set of $N_j$ subpixels, each i-th subpixel of the $N_j$ subpixels to be illuminated for $SF_j$, where $f$ is a function comprising a plurality of functions of the controller and $q_{ij}$ is a vector that comprises a plurality of parameters to form a subframe.

4. The system of claim 3, wherein the plurality of parameters for the j-th subframe comprise:
   $t_{ij}$=time when the i-th subpixel is illuminated;
   $D_{ij}$=duration of the i-th subpixel illumination;
   $(x_{ij}, y_{ij})$=location of the i-th subpixel within the emissive array of subpixels;
   $I_{ij}$=intensity of the i-th subpixel illumination;
   $p_{ij}$=position of the light deviator for the i-th subpixel; and
   a set of incremental deviations of the plurality of parameters, the incremental deviations comprising:
      $\Delta t_{ij}$=time deviation during which the i-th subpixel is illuminated;
      $\Delta x_{ij}$, $\Delta y_{ij}$=position deviations from the i-th subpixel; and
      $\Delta p_{ij}$=position deviations of the light deviator for the i-th subpixel.

5. The system of claim 4, wherein $t_{ij}$ comprises a function of mod $(p^k_{ij}, c^k)$, wherein $p^k_{ij}$ is a cyclical component of $p_{ij}$ with a periodicity of $c^k$.

6. The system of claim 5, wherein a rate of change of the cyclical component of $p_{ij}$ is adjustable by the controller.

7. The system of claim 5, wherein at least one subframe of the plurality of subframes is temporally multiplexed to the array of subpixels faster than the periodicity of the cyclical component of $p_{ij}$.

8. The system of claim 1, wherein the light deviator comprises a rotatable prism.

9. The system of claim 1, wherein each of the plurality of predetermined positions of the light deviator corresponds to a separate one of the plurality of subframes.

10. The system of claim 1, wherein the light emitted by each subpixel of at least the portion of the subpixels is laterally shifted towards one or more virtual subpixel locations corresponding to the one or more predetermined light deviator positions.

11. A system to compensate for sub-standard subpixels in a display device, the system comprising:
   a display system that directs light emitted by subpixels of an emissive array towards a viewing region such that the light emitted by each of the subpixels is directed towards a different virtual subpixel location in the viewing region during each of a plurality of predetermined time periods; and
   a controller that:
      converts input data into a sequence of instructions for illuminating at least a portion of the subpixels during a plurality of subframes, the sequence of instructions causing each subpixel of at least the portion of the subpixels to be illuminated during one or more of the plurality of predetermined time periods such that sub-standard subpixels are each compensated for with light from at least one standard subpixel; and temporally multiplexes the plurality of subframes so as to display an image that is viewable at the viewing region, wherein:

the plurality of subframes are generated by the following representation:

$$SF_j = \Sigma_i^{N_j} f(q_{ij}),$$

where $SF_j$ is a j-th subframe, comprising a set of $N_j$ subpixels, each i-th subpixel of the $N_j$ subpixels to be illuminated for $SF_j$, where $f$ is a function comprising a plurality of functions of the controller and $q_{ij}$ is a vector that comprises a plurality of parameters to form a subframe, wherein the plurality of parameters for the j-th subframe comprise:

$t_{ij}$=time when the i-th subpixel is illuminated, wherein $t_{ij}$ comprises a function of mod ($P^k_{ij}$, $c^k$), wherein $p^k_{ij}$ is a cyclical component of $p_{ij}$ with a periodicity of $c^k$;

$D_{ij}$=duration of the i-th subpixel illumination;

$(x_{ij}, y_{ij})$=location of the i-th subpixel within the emissive array of subpixels;

$I_{ij}$=intensity of the i-th subpixel illumination;

$p_{ij}$=position of the light deviator for the i-th subpixel; and a set of incremental deviations of the plurality of parameters, the incremental deviations comprising:

$\Delta t_{ij}$=time deviation during which the i-th subpixel is illuminated;

$\Delta x_{ij}, \Delta y_{ij}$=position deviations from the i-th subpixel; and $\Delta p_{ij}$=position deviations of the light deviator for the i-th subpixel.

12. The system of claim 11, wherein the compensation of the sub-standard subpixels with light from at least one standard subpixel includes modifying at least one of color or intensity of light at an apparent location of the sub-standard subpixel.

13. A method to compensate for sub-standard subpixels in a display device, the method comprising:

converting input data by a controller into a sequence of instructions for illuminating at least a portion of subpixels of an emissive array during a plurality of subframes;

laterally shifting light emitted by the subpixels towards a viewing region using a light deviator that is movable between a plurality of predetermined positions corresponding to one or more lateral-light-shifting degrees of freedom;

causing, in accordance with the sequence of instructions, each subpixel of at least the portion of the subpixels to be illuminated while the light deviator is positioned at one or more predetermined light deviator positions such that sub-standard subpixels are each compensated for with light laterally shifted from at least one standard subpixel; and temporally multiplexing the plurality of subframes so as to display an image that is viewable at the viewing region, wherein:

the plurality of subframes comprises pairs of subframes, with each pair comprising a first subframe and a second subframe; and causing each subpixel of at least the portion of the subpixels to be illuminated further comprises:

causing, in accordance with the sequence of instructions, a first set of standard subpixels to be illuminated during the first subframe of a pair to compensate for at least a portion of the sub-standard subpixels present in the second subframe;

causing, in accordance with the sequence of instructions, a second set of standard subpixels to be illuminated during the second subframe to compensate for at least a portion of the sub-standard subpixels present in the first subframe;

the first subframe comprises a portion of the converted input data distributed in even-numbered lines of the first subframe;

the second subframe comprises another portion of the converted input data distributed in odd-numbered lines of the second subframe; and sub-standard subpixel compensation for the first subframe occurs in the even-numbered lines of the second subframe and sub-standard subpixel compensation for the second subframe occurs in the odd-numbered lines of the first subframe.

14. The method of claim 13, wherein:

a first set of subframes of the plurality of subframes comprises the converted input data; and causing each subpixel of at least the portion of the subpixels to be illuminated further comprises causing, in accordance with the sequence of instructions, one or more standard subpixels to be illuminated during a second set of subframes of the plurality of subframes to compensate for sub-standard subpixels that are present in the first set of subframes.

15. The method of claim 13, wherein the plurality of subframes are generated by the following representation:

$$SF_j = \Sigma_i^{N_j} f(q_{ij}),$$

where $SF_j$ is the j-th subframe, comprising a set of $N_j$ subpixels, each i-th subpixel of the $N_j$ subpixels to be illuminated for $SF_j$, where $f$ is a function comprising the plurality of functions of the controller and $q_{ij}$ is a vector that comprises a plurality of input parameters to form a subframe.

16. The system of claim 11, wherein the display system comprises a display system of a head mounted display.

17. The system of claim 11, wherein the display system comprises an optical system that:

receives the light emitted by the subpixels and laterally shifts the received light by a light deviator that is movable between a plurality of predetermined positions corresponding to one or more lateral-light-shifting degrees of freedom; and directs the laterally shifted light towards the viewing region.

18. The system of claim 11, wherein the display system comprises at least one actuator that translates a position of the emissive array such that the emissive array is in a different predetermined position during each of the plurality of predetermined time periods.

19. The system of claim 1, wherein the optical system comprises an optical system of a head mounted display.

20. The system of claim 1, wherein the compensation of the sub-standard subpixels with light from at least one standard subpixel includes modifying at least one of color or intensity of light at an apparent location of the sub-standard subpixel.

* * * * *

UNITED STATES PATENT AND TRADEMARK OFFICE
CERTIFICATE OF CORRECTION

PATENT NO. : 10,957,240 B1
APPLICATION NO. : 16/357853
DATED : March 23, 2021
INVENTOR(S) : Jasmine Soria Sears It is certified that error appears in the above-identified patent and that said Letters Patent is hereby corrected as shown below:

In the Claims

In Line 1 of Claim 5, "wherein $t_u$ comprises" should be replaced with "wherein $t_{ij}$ comprises".

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*